(12) United States Patent
O'Brien et al.

(10) Patent No.: US 8,095,497 B2
(45) Date of Patent: *Jan. 10, 2012

(54) PROCESS FOR DATA DRIVEN APPLICATION INTEGRATION FOR B2B

(75) Inventors: Terrence Ross O'Brien, Rochester, MN (US); William Craig Rapp, Rochester, MN (US); Richard Joseph Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

This patent is subject to a terminal disclaimer.

(21) Appl. No.: 12/015,897

(22) Filed: Jan. 17, 2008

(65) Prior Publication Data
US 2008/0133381 A1 Jun. 5, 2008

Related U.S. Application Data

(62) Division of application No. 09/837,041, filed on Apr. 18, 2001, now Pat. No. 7,373,349.

(51) Int. Cl.
*G06F 7/00* (2006.01)

(52) U.S. Cl. ......... 707/100; 707/4; 707/104.1; 709/227; 719/313; 719/328

(58) Field of Classification Search ............ 705/26, 705/27; 707/100.4, 104.1; 709/227; 719/313, 719/328
See application file for complete search history.

(56) References Cited

U.S. PATENT DOCUMENTS

| | | | |
|---|---|---|---|
| 6,125,391 A * | 9/2000 | Meltzer et al. | 709/223 |
| 6,453,306 B1 | 9/2002 | Quelene | |
| 6,591,260 B1 | 7/2003 | Schwarzhoff et al. | |
| 2001/0039570 A1 | 11/2001 | Stewart et al. | |
| 2001/0047311 A1 | 11/2001 | Singh | |
| 2002/0049790 A1 | 4/2002 | Ricker et al. | |
| 2002/0103660 A1 | 8/2002 | Cramon et al. | |
| 2002/0111879 A1 | 8/2002 | Melero et al. | |
| 2002/0116205 A1 * | 8/2002 | Ankireddipally et al. | 705/1 |
| 2002/0128946 A1 | 9/2002 | Chehade et al. | |
| 2002/0161688 A1 | 10/2002 | Stewart et al. | |
| 2002/0169842 A1 | 11/2002 | Christensen et al. | |
| 2003/0023604 A1 | 1/2003 | O'Brien et al. | |
| 2003/0028654 A1 | 2/2003 | Abjanic et al. | |
| 2003/0069975 A1 | 4/2003 | Abjanic et al. | |

OTHER PUBLICATIONS

Haverson, Debra, "Citizen gain online", Imaging &Document Solutions, dated Jan. 2001.*

* cited by examiner

*Primary Examiner* — Mark Fadok
(74) *Attorney, Agent, or Firm* — Patterson & Sheridan LLP

(57) ABSTRACT

Aspects of the present embodiments provide an eCommerce environment adapted to accept and process various message types (e.g., cXML and mXML). In general, requests are provided from a requesting entity to an application hosting entity. Data from incoming requests are mapped to a format understandable to an appropriate application(s). Responses from the application(s) are then mapped into a response format acceptable by the requesting entity. To this end, embodiments disclosed herein provide processes for the development and execution of a data driven process for mapping multiple request/response message pairs to a single application interface or set of application interfaces. In one embodiment, these processes are driven by development time and run time documents that describe a development time view of the message pairs and the application interfaces as well as runtime instructions for providing the mappings, respectively.

10 Claims, 16 Drawing Sheets

BUSINESS PROCESS EDITOR

File | Edit | Publish | Help

1302 — Application Access Method | Process Flow

| Access Method Name | OrderEntry |
| Access Method Type | Program Call |

Properties

| System | rchas001 | Userid | rstevens | Password | ***** |

| PCM document | orderentrypgm | Browse |

Documents

| Input | orderentrypgm | Browse | Load |
| ● PCML | ○ XML |
| Output | orderentrypgm | Browse | Load |
| ● PCML | ○ XML |

| Field ID | Name | Default | Display |
|---|---|---|---|
| Input |  |  |  |
|   XYZ |  |  |  |
|     inum | Item Number |  | ✓ |
|     q | Item Quantity | 1 | ✓ |
| Output |  |  |  |
|   XYZ |  |  |  |
|     p | Item Price |  | ✓ |

| BUSINESS PROCESS EDITOR | _ □ × |
|---|---|

| File | Edit | Publish | Help | |
|---|---|---|---|---|

*1304*

| Application Access Method | Process Flow |
|---|---|
| Protocol | Ariba |
| Action | Order Request |
| Access Method names | Order Entry |

Input Mappings

| ▢ Request Fields<br>◉─▢ B2B Header<br>　　　▢ Field 1<br>◉─▢ Item Out<br>　　◉─▢ Item ID<br>　　　　▢ SupplierPartID<br>　　▢ @quantity | ▢ Access Method Fields<br>　▢ Item Number<br>　▢ Item Quantity<br>　▢ Billing Address<br>　▢ Shipping Address | Add Mappings |
|---|---|---|

Output Mappings

| ▢ Response Fields<br>◉─▢ Item Out<br>　　▢ @quantity | ▢ Access Method Fields<br>　▢ Item Price<br>　▢ Shipping Date<br>　▢ Shipping Status | Add Mappings |
|---|---|---|

Access Method Fields

| ▢ Input<br>　▢ Item Number<br>　▢ Item Quantity<br>▢ Output<br>　▢ Item Price | /itemOut/itemID/SupplierPartID | Remove |
|---|---|---|
| | /itemOut/@quantity | |
| | | Remove All |
| | /itemOut/@price | |

*Fig. 14*

PROCESS FOR DATA DRIVEN APPLICATION INTEGRATION FOR B2B

CROSS-REFERENCE TO RELATED APPLICATIONS

This is a divisional of U.S. patent application Ser. No. 09/837,041, filed Apr. 18, 2001, now U.S. Pat. No. 7,373,349, which is herein incorporated by reference.

BACKGROUND OF THE INVENTION

1. Field of the Invention

The present invention relates to distributed systems configured to process requests provided in different formats.

2. Background of the Related Art

Wide area networks such as the Internet provide a convenient forum for engaging in a variety of commercial activities, generally referred to as eCommerce. A typical eCommerce environment 100 comprising buyers and sellers connected by the Internet is illustrated in FIG. 1. In the illustrative buyer/supplier model, a buyer organization 102 has purchased procurement software 103 from a third party vendor. The procurement software 103 allows an individual in the buying organization 102, commonly referred to as a requisitioner 104, to use a browser to make purchases. The requisitioner 104 can choose from a list of approved catalogs and shop for the desired items. The catalogs are hosted locally at the buyer organization 102 on a catalog server 106. The catalog information is uploaded to the catalog server 106 by a supplier $110_1$, $110_2$, . . . $110_N$. Each supplier $110_N$ is responsible providing their catalog information to the buyer organization 102.

Viewing the catalog, the requisitioner 104 selects the items and quantities needed. When finished, this order is submitted and captured by the procurement software.

The procurement software 103 next notifies a designated approver 108 that a new order request has been placed. The approver 108 is part of the buying organization and uses a browser to view the order and make any necessary changes in price and/or quantities. If the request looks satisfactory, the approver 108 approves the order request.

An approved order request results in a purchase order (PO) message being sent by the procurement software 103 to the appropriate supplier $110_N$ of the goods. The supplier $110_N$ accepts the PO, processes it as necessary and sends a PO response message to indicate that the order was accepted.

FIG. 2 shows an alternative eCommerce environment 200 in which a requisitioner 204 of a buying organization 202 is provided with the ability to shop from a remote catalog hosted directly at the web site of a supplier $210_N$. In this scenario, the requisitioner 204 again uses a browser to choose an approved catalog to shop from. The procurement software 203 then indicates that the catalog is hosted remotely. The procurement software 203 obtains, either from local storage or from the supplier site, the URL to use for shopping the catalog and returns this information to the browser of the requisitioner 204. The requisitioner 204 then shops the remote catalog and places items in a shopping cart. Upon completion, the requisitioner 204 confirms the order and checks out. The supplier $210_N$ is then responsible for sending the shopping cart contents to an approver 208 of the buyer organization 202. The remaining steps are as those described with reference to FIG. 1. Thus, the approver 208 approves the order and causes a PO to be sent to the supplier $210_N$. The supplier $210_N$ processes the PO by integrating it with back-end applications or by directing it to a commerce application for processing.

One problem with conventional eCommerce systems is that the buying organizations are installing newer versions of procurement software in an attempt to streamline the purchasing process and reduce expenses. These versions utilize protocols not supported by the legacy systems of the suppliers. These protocols include XML-based protocols, such as Commerce XML (cXML), which allow buyers to communicate with multiple seller organizations. Accordingly, buyers are motivated to do business with suppliers that support the new protocols. Suppliers must therefore support these new protocols or be at a competitive disadvantage to those sellers who do support the protocols. To this end, suppliers must either install new applications or find a means to support the new protocols using the existing order processing software (e.g., reprogram the legacy equipment). Installing new applications and reprogramming existing software are both cost prohibitive and therefore not viable solutions.

There are several existing products that attempt to address integration of existing business solutions with defined B2B protocols. In general, existing solutions allow an XML formatted message to be mapped to one or more business applications for processing. However, the user is required to have knowledge of all fields in the XML message that apply to a given type of B2B request. Furthermore, some products require a unique adapter program to be generated for each B2B request type to be mapped to a given business application. This adapter program must be ported, compiled and installed on the platform hosting the target business applications.

Therefore, there is a need, in an eCommerce environment, to process requests having various formats including formats not originally/directly supported by supplier's applications.

SUMMARY OF THE INVENTION

Systems, methods, and articles of manufacture are provided for processing eCommerce transactions. In one embodiment, a system for handling eCommerce requests is provided. The system comprises at least one application configured to process a request in a transformed format, wherein the request is received from one of a plurality of requesting entities in an original format and mapped to the transformed format. At least one specification document is configured to produce metadata defining a relationship between data of the request in the original format and data of the request in the transformed format. A flow manager is configured to utilize the metadata to map the request in the original format to the request in the transformed format and to call the at least one application.

In still another embodiment, a system for handling eCommerce requests received from one of a plurality of requesting entities is provided. The system comprises at least two applications each configured to process requests in a transformed format; wherein a first application is configured to process a first request type and a second application is configured to process a request of a second type. At least two access methods are each configured to define an interface for the at least two applications. Illustratively, the at least two access methods comprise a first access method configured for the first request type and for the first application and a second access method configured for the second request type and for the second application. A flow manager is configured to utilize metadata to map the requests from an original format to the transformed format and to call one or more of the at least two applications.

In yet another embodiment, a method of processing eCommerce requests is provided. The method comprises receiving a request of a first request type comprising a first plurality of input fields; determining an application to invoke, wherein the application is configured to process a request of a second request type comprising a second plurality of input fields; invoking an access method, wherein the access method is configured to define an interface of the application for the second request type; mapping at least a portion of the first plurality of input fields to the second plurality of input fields; and invoking the application.

In still another embodiment, a signal bearing medium, comprising a program which, when executed by a processor, performs a method processing eCommerce requests is provided. The method comprises receiving a request of a first request type comprising a first plurality of input fields; determining an application to invoke, wherein the application is configured to process a request of a second request type comprising a second plurality of input fields; invoking an access method, wherein the access method is configured to define an interface of the application for the second request type; mapping at least a portion of the first plurality of input fields to the second plurality of input fields; and invoking the application.

In still another embodiment, a data structure is configured as an interface definition of a message format of a particular eCommerce transaction type. The data structure comprises protocol information identifying a protocol and the particular eCommerce transaction type, request data format information identifying a request message format for the particular eCommerce transaction type, wherein the request message format comprises a plurality of input fields and input field information identifying at least a portion of the plurality of input fields.

In still another embodiment, a data structure is configured as an interface definition of a request message format and a response message format of a particular eCommerce transaction type. The data structure comprises protocol information identifying a protocol and a transaction type; request data format information identifying the request message format, wherein the request message format comprises a plurality of input fields; and input field information identifying at least a portion of the plurality of input fields. The plurality of input fields includes input fields for at least two different request types and the input field information represents only a first request type. The data structure further comprises response data format information identifying a response message format, wherein the response message format comprises a plurality of output fields; and output field information identifying at least a portion of the plurality of output fields. The plurality of output fields includes output fields for the at least two different request types and the output field information represents only the first request type.

BRIEF DESCRIPTION OF THE DRAWINGS

So that the manner in which the above recited features and embodiments are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 13 shows a graphical user interface of a specification development tool.

FIG. 14 shows a graphical user interface of a specification development tool.

DETAILED DESCRIPTION OF THE PREFERRED EMBODIMENTS

Introduction

Figure 1:
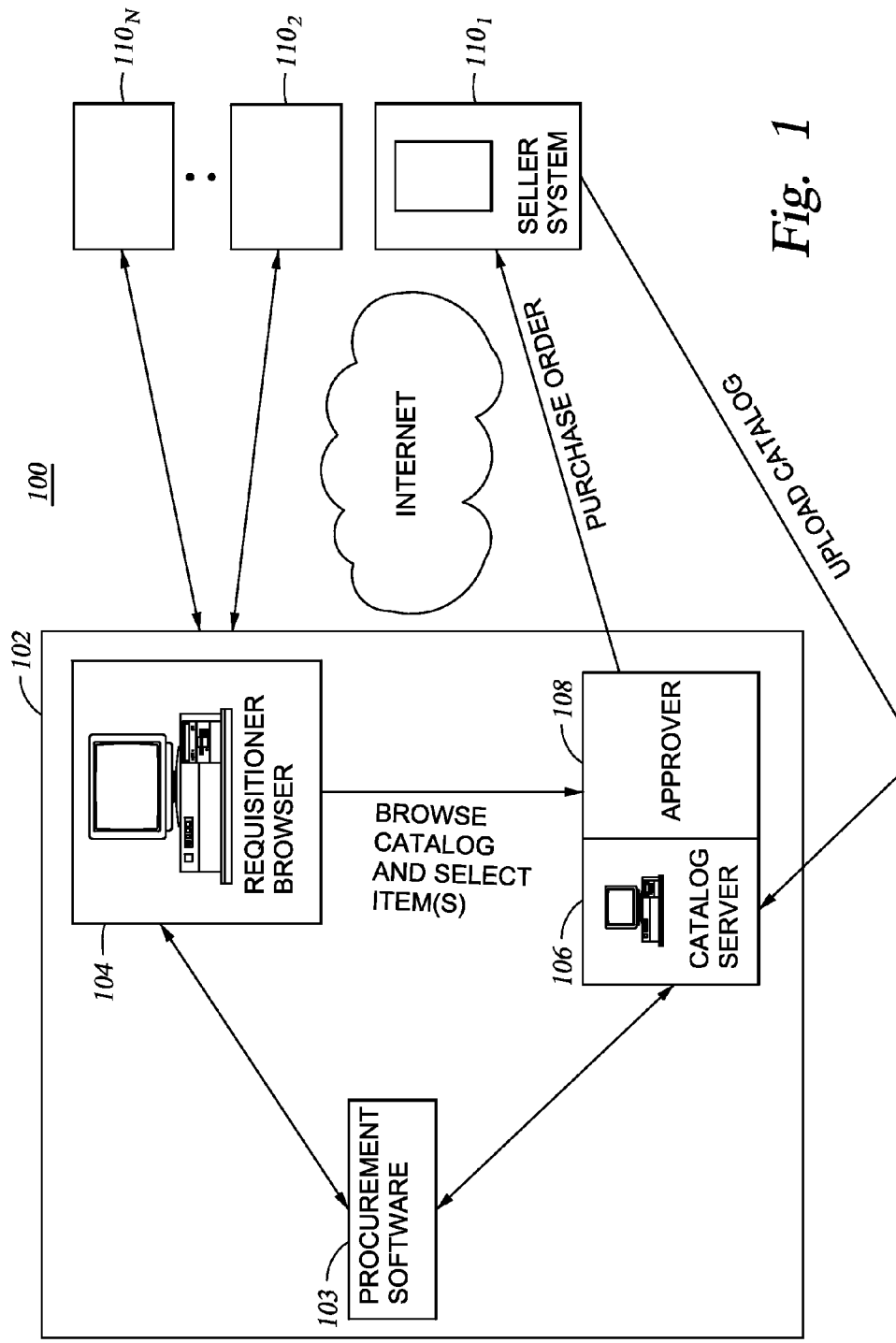
FIG. 1 shows a typical eCommerce environment comprising buyers and sellers connected by the Internet.
Figure 2:
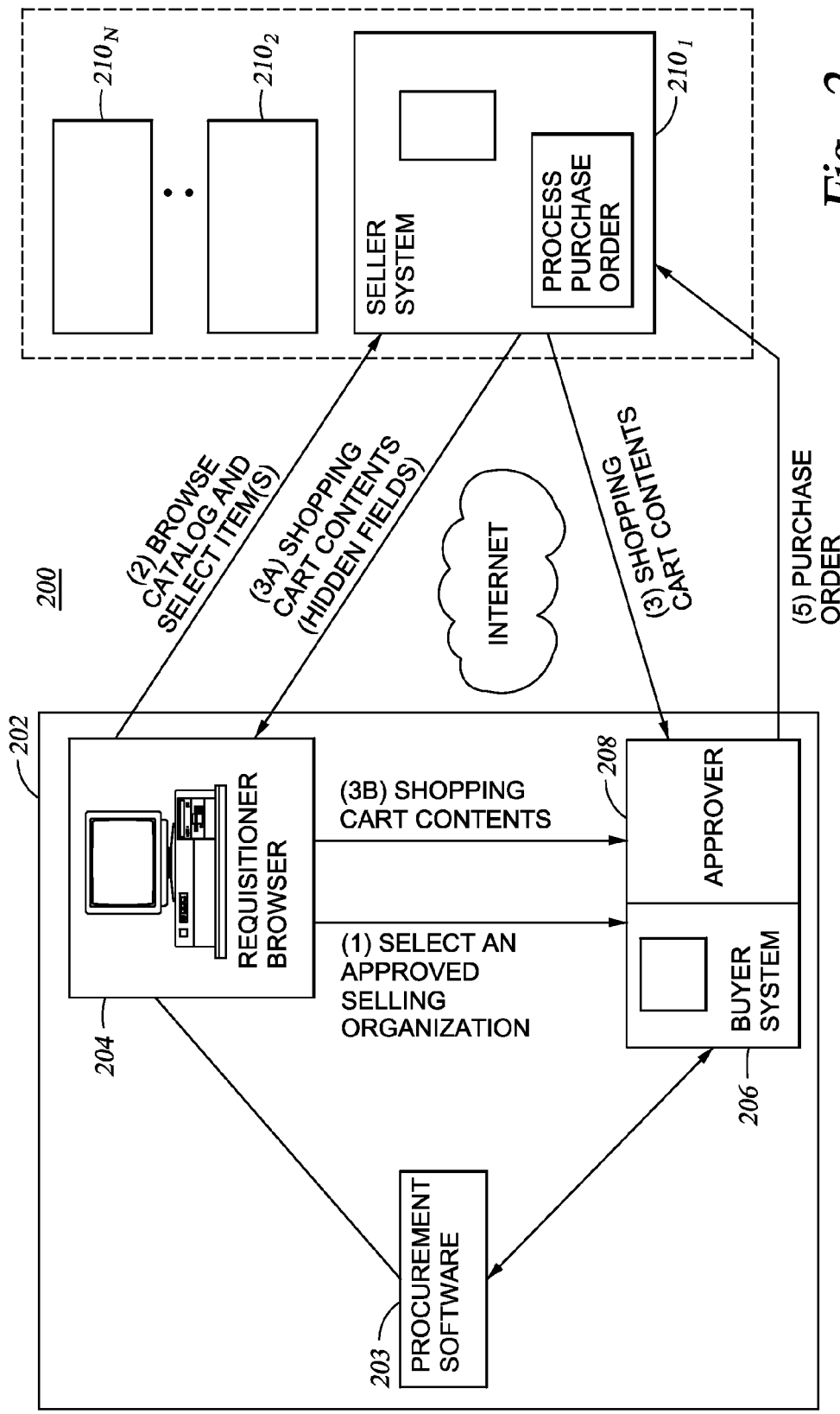
FIG. 2 shows an alternative eCommerce environment in which a requisitioner of a buying organization is provided with the ability to shop from a remote catalog hosted directly at the web site of a supplier.

Aspects of the present invention provide an eCommerce environment adapted to accept and process various message types (e.g., cXML and mXML). In general, requests are provided from a requesting entity to an application hosting entity. Data from incoming requests are mapped to a format understandable to an appropriate application(s). Responses from the application(s) are then mapped into a response format acceptable by the requesting entity.

To this end, embodiments disclosed herein provide processes for the development and execution of a data driven process for mapping multiple request/response message pairs to a single application interface or set of application interfaces. In one embodiment, these processes are driven by development time and run time documents that describe a development time view of the message pairs and the application interfaces as well as runtime instructions for providing the mappings, respectively. As used herein, "development time" documents/view refers to various artifacts that describe flow processing and mapping rules. "Run time" documents/view refers to the collection of software components that operate to implement the flow processing and mapping rules.

As used herein, "mapping" generally refers to the process of relating one input to another input. For example, mapping includes converting a message in one format to a message in another format based on predetermined rules (this may be referred to as message-to-message transformation). In addition, mapping refers to extracting a value from a field in a message, converting it to an appropriate data type, and then placing that data at a location where an application is expecting it. In one aspect, the location may be a message passed into an application that is expecting a message as input. In another aspect, the location is a parameter on an application that is expecting a set of parameters on call invocation. The foregoing aspects illustrate input mapping; however, the present embodiments also provide for output mapping. Output mapping involves taking values output from an application and placing the values in a message in the proper format (i.e., in a format understandable by procurement software).

Accordingly, mapping assumes that the structure of a source and a target are known. For example, messages are typically broken into separate fields. In XML parlance, fields in a message are delimited by tags which name an element. A single element has attributes that further describe that element. A single element may also contain other elements with associated attributes. In non-XML messages, fields may be arbitrarily defined by the message designer as structures, strings or bits, etc. The mapping rules indicate how a particular source field is to be processed and subsequently placed into a target field. An example of mapping according to the embodiments provided herein would be associating a product number from a B2B request to a parameter of a program.

Mapping is needed because two separately developed applications or processes rarely have the same input and output requirements in terms of message format and/or data. Such applications that were not originally designed to communicate with one another require an intermediate process, such as those described herein, that allow the applications to communicate with each other without modification.

Embodiments described herein use a markup language known as extensible mark up language (XML) to advantage. XML is a popular, well-accepted language in the industry. Because many tools are available to process XML documents, viewing such documents for purposes of education and debugging is made easy. In addition, the extensible nature of XML facilitates adding functionality to existing products while continuing to maintain compatibility between releases of the products. These and other advantages make XML an excellent candidate for the methods and systems of the present application. However, embodiments of the invention are not limited to XML or XML-based protocols and the inventors contemplate using other languages, known and unknown. Accordingly, reference to XML and other specific languages and protocols is merely illustrative.

Moreover, while the embodiments have and hereinafter will be described in the context of fully functioning computers and computer systems, those skilled in the art will appreciate that the various embodiments of the invention are capable of being distributed as a program product in a variety of forms, and that embodiments of the invention apply equally regardless of the particular type of signal bearing media used to actually carry out the distribution. Examples of signal bearing media include, but are not limited to, recordable type media such as volatile and nonvolatile memory devices, floppy and other removable disks, hard disk drives, optical disks (e.g., CD-ROMs, DVDs, etc.), and transmission type media such as digital and analog communication links. Transmission type media include information conveyed to a computer by a communications medium, such as through a computer or telephone network, and include wireless communications. The latter embodiment specifically includes information downloaded from the Internet and other networks. Such signal-bearing media, when carrying computer-readable instructions that direct the functions of the present invention, represent embodiments of the present invention.

System Architecture, Data Structures, Data Processors and Interfaces

Figure 3:
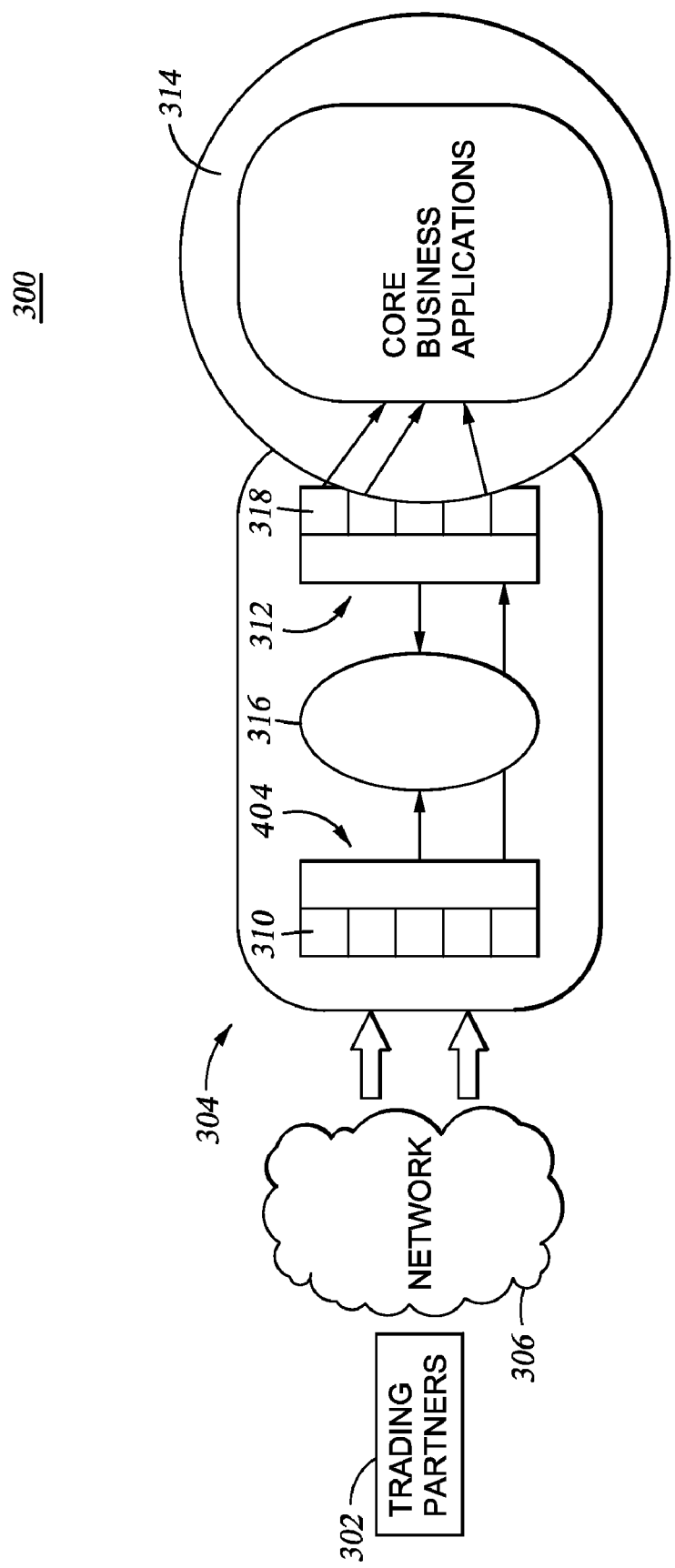
FIG. 3 shows a high level diagram of an embodiment of a B2B environment.

FIG. 3 shows a high level diagram of an embodiment of a B2B environment 300. The environment generally includes a plurality of trading partners 302 connected to a supplier system 304 via a network 306 (e.g., the Internet). The trading partners 302 execute procurement software to generate a B2B request and transmit the request to the supplier system 304. Illustrative requests include purchase orders (PO), order status checks, and catalog maintenance. The supplier system 304 includes a front-end gateway 404 adapted to handle the interfacing with the trading partners 302 over a variety of connectivity mechanisms and protocols. In one embodiment, the front-end gateway 404 includes a collection of front-end protocols 310 to support the requests received from the trading partners 302. The front-end protocols 310 may be plug-ins and may be installed locally from a signal-bearing medium (e.g., a CD-ROM) or downloaded from the network 306.

A back-end flow manager 312 and the front-end gateway 404 communicate via a transport mechanism 316. In one embodiment, the transport mechanism 316 is a queuing mechanism. The back-end flow manager 312 is responsible for processing the requests by tying them to an appropriate application 314 (e.g., Enterprise Resource Planning (ERP), supply chain application, etc.). Back-end access methods 318 are provided to facilitate a connection with the appropriate application 314. As with the front-end protocols 310, the access methods 318 may be installed locally or downloaded from a remote site on the network 306. Each access method 318 is configured to handle a particular type of interfacing mechanism, as will be described in more detail below.

For simplicity, the front-end gateway 404 and the back-end flow manager 312 are shown as an integral part of a single system. However, in another embodiment, the front-end gateway 404 and the back-end flow manager 312 reside on different systems remotely located from one another. Such a distributed embodiment is facilitated by the use of transport mechanisms (e.g., transport mechanism 316) to communicate.

Figure 4:
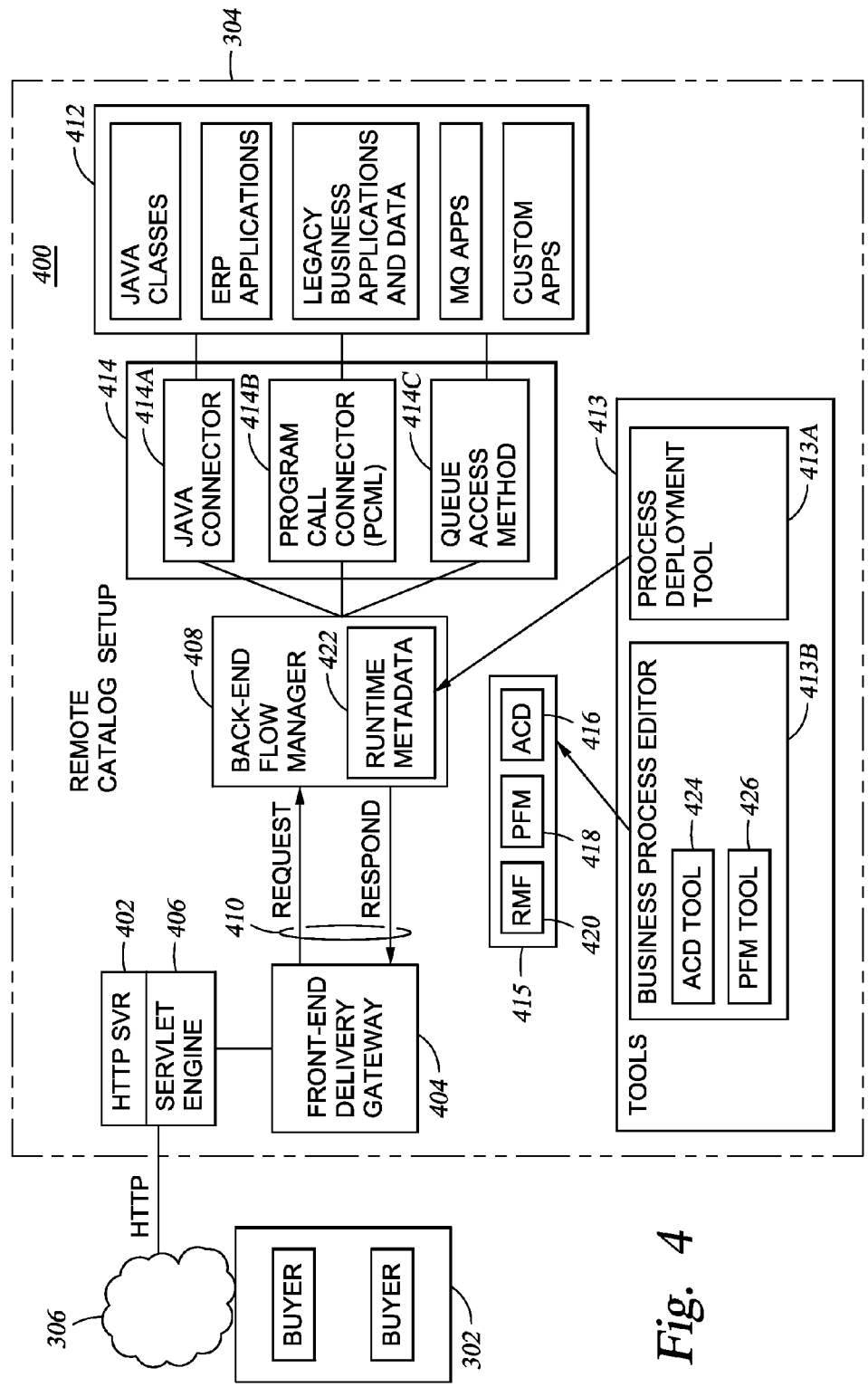
FIG. 4 shows a B2B environment which, in one embodiment, may be understood as a more detailed illustration of the B2B environment shown in FIG. 3.

FIG. 4 shows a B2B environment 400 which, in one embodiment, may be understood as a more detailed figure of the B2B environment 300 shown in FIG. 3. Accordingly, in some cases, like numbers have been used to correlate FIGS. 3 and 4. In general, the B2B environment 400 includes trading partners 302 connected to the supplier system 304 via network 306. The trading partners 302 receive responses from the supplier system 304 in response to requests. The requests may be any variety of protocols, such as cXML from Ariba and mXML from Metiom. Other protocols include xCBL, OCI, and ebXML. Accordingly, the supplier system 304 is configured to support the protocols used by the trading partners 302.

The supplier system 304 includes a front-end gateway 404 connected to an HTTP server 402. The HTTP server 402 is configured to receive and send messages from/to the network 306 in the popular transfer protocol known as hypertext-transfer-protocol (HTTP). Incoming requests are sent from the HTTP server 402 to the front-end gateway 404 which, in a particular embodiment, is implemented as a Java servlet. As such, the supplier system 400 includes an application servlet engine 406 to allow communication between the HTTP server 402 and the front-end gateway 404. Two available engines that may be used to advantage are (1) the WebSphere Application Server used in combination with the IBM HTTP server and (2) the Domino server. The Domino server has a built-in servlet engine and an HTTP server that can also be used to host Java servlets.

The front-end gateway 404 is responsible for examining and validating incoming requests. Any authentication and authorization information associated with a particular request is validated. In some cases, requests need to be transformed by the front-end gateway 404 to a normalized format consumable by a back-end flow manager 408. In other cases requests are passed exactly as received. For example, in one embodiment, the back-end flow manager 408 is configured for XML. If the requests are received in a format other than XML, the front-end gateway 404 is configured to convert the request into an XML representation.

The front-end gateway 404 communicates with the back-end flow manager 408 via a queuing mechanism 410, such as MQ Series from IBM. Thus, upon validating, authenticating and, in some cases, transforming an incoming message, the message is placed on the queuing mechanism 410. The front-end gateway 404 then waits for an associated response from the back-end flow manager 408 on a response queue.

The back-end flow manager 408 is configured to map incoming requests into a format understandable by a plurality of applications 412 and then return an appropriate response. Illustratively, the rules for mapping these messages are provided as a series of XML documents which embody the mapping rules used to associate data provided with a B2B request and the interface defined for an existing application. These documents are referred to herein as a runtime metadata document 422 (also referred to herein as the "runtime metadata 422").

In one embodiment, the runtime metadata document 422 is created and/or utilized by tools 413 (also referred to herein as "tools suite 413"). In one embodiment, the tools 413 comprise a Process Deployment Tool 413A and a Business Process Editor Tool 413B. The Business Process Editor Tool 413B in turn comprises an ACD creation tool 424 and a Process Flow creation tool 426. These XML documents and the tools 413 will be described in more detail below.

Illustratively, the applications 412 include Java classes, ERP applications, legacy business applications and data, MQ applications, and custom applications. For each application type, an access method 414 (which may also be referred to herein as a "connector") is provided. The access methods 414 are adapted to support an appropriate interfacing mechanism for each application 412. For the applications 412 shown in FIG. 4, three popular interfacing mechanisms are program calls, queues and Java methods. Accordingly, the supplier system 304 of FIG. 4 includes three access methods 414: a Java access method 414a, a program call access method 414b, and a queue application access method 414c.

It is understood that the applications 412 and the access methods 414 shown in FIG. 4 are merely illustrative and the supplier system 304 may support any number of applications 412 and access methods 414. For example, the supplier system 304 may also include an SQL access method for databases. For brevity, discussion of specific access methods 414 is limited to the Java access method 414a, the program call access method 414b, and the queue application access method 414c.

In general, an access method 414 is the "template" for an access method instance. Thus, an access method 414 is specialized into a specific access method instance, herein referred to as an Application Connector Document (ACD). By analogy to object oriented programming, the access method 414 can be thought of like a class and the access method instance (i.e., the ACD) is like an object. ACDs are described in more detail below.

Each access method 414 defines properties that are needed by the access method 414. Properties are name-value pairs that are presented to an end user at deployment time and allow for configuration information to be passed to the access method 414. For example, a property may be a system name, a user profile, a class name or a path to a document. In one embodiment, properties will always be strings and may have default values or values set at deployment.

Each access method 414 also has a mechanism used to define input and output fields. In one embodiment, such mechanisms include a PCML (Program Call Markup Language) documents and XML documents. PCML documents provide a rich tag specification for describing parameters to a program. The PCML document may be optimized to define a fixed structure buffer which is passed into an application. An XML document is a tagged string that is self-describing and can be used for applications that require XML as input.

Which mechanism/document to use depends on the nature of the application 412 to be accessed. An access method 414 may support one or both of these mechanisms. If an access method 414 uses PCML as the technique for defining input and outputs, then a property field can be defined to contain a path to the PCML document. This allows the creator of the access method 414 to specify the PCML document that describes the input/output to the application. If an access method 414 uses XML as the technique for defining input and output fields, then two property fields may be defined, one to contain a path to the XML document for input and one for the path to the XML document for output.

Illustratively, each access method 414 contains a root element called "Connector" that contains properties, input and output elements. The properties element contains a set of elements with names for the properties that access method 414 has defined. In one embodiment, the properties of an access method 414 are specified by a user using a tool, as will be described in more detail below. Once the properties have been defined to the tool, the tool will present them to an administrator so that values can be provided. In addition, the tool will allow the administrator to map fields from the input/output message to the application interface (input/output fields). When the administrator has finished providing all the information required, the tool will generate a runtime metadata specification that will be used by the back-end flow manager 408 to invoke the access method 414.

PCML Access Method: The program call access method 414b can be used to call any program resident locally or remotely. In one embodiment, the program call access method 414b is a PCML document that describes the program to be called and the parameters expected by that program.

The properties that are defined for an exemplary program call access method 414b are shown in Table I.

TABLE I

```
001    <!ELEMENT connector (properties,input,output)>
002    <!ATTLIST connector
003      type NMTOKEN #FIXED "programcall"
004      name CDATA #REQUIRED
005      version (1.0) #REQUIRED
006    >
007    <!ELEMENT properties (system,userid,password,pcmldocument)>
008    <!ELEMENT system (#PCDATA)>
009    <!ELEMENT userid (#PCDATA)>
010    <!ELEMENT password (#PCDATA)>
011    <!ATTLIST password
```

TABLE I-continued

```
012    encrypt (yes) #REQUIRED
013    >
014    <!ELEMENT pcmldocument (#PCDATA)>
015    <!ELEMENT input (field*)>
016    <!ATTLIST input
017    type (pcml) #REQUIRED
018    >
019    <!ELEMENT output (field*)>
020    <!ATTLIST output
021    type (pcml) #REQUIRED
022    >
023    <!ELEMENT field EMPTY>
024    <!ATTLIST field
025    ref CDATA #REQUIRED
026    display (yes | no) #REQUIRED
027    name CDATA #IMPLIED
028    default CDATA #IMPLIED
029    >
```

The program call access method 414b only supports a PCML interface definition. A business partner or customer who desires to create an instance of the PCML access method 414a to invoke a specific application 412 generates a PCML document to describe the interface to the specific application. For example, assume an application 412 that is going to be invoked with the program call access method 414a has three input fields and two output fields. A user writes a PCML document that lists the name of the application, the three input fields and the two output fields.

Queue Access Method: The queue application access method 414c is used to send and receive messages on a queuing mechanism, such as an MQ Series queue or an iSeries data queue, both available from IBM. The queues can be defined locally or on a remote system. The queue application access method 414c defines the format of the message to be placed on the queue and, illustratively, is a PCML document or an XML document. The message is in a format expected by the receiving application 412.

In one embodiment, the queue application access method 414c supports two queue techniques: iSeries 400 data queues and MQ series queues, both available from IBM. The queue application access method 414c may also support two interface specification techniques: PCML and XML. Therefore, in one embodiment, the properties define a sending queue (required, SendQueue) and a receiving queue (optional, ReceiveQueue). The properties defined for one embodiment of the queue application access method 414c are shown in Table II.

TABLE II

```
001    <!ELEMENT connector (properties,input,output)>
002    <!ATTLIST connector
003    type CDATA #FIXED "DataQueue"
004    name CDATA #REQUIRED
005    connectversion (1.0) #REQUIRED
006    >
007    <!ELEMENT properties
008    (MessageType,DQSendKeyed,DQSendKey,DQSendQueueName,
          DQSendLibrary,DQReceiveKeyed,DQReceiveKey,
          DQReceiveQueue,Name,DQReceiveLibrary,
          DQReceiveWaitTime,pcmldocument,system,userid,password)>
009    <!ELEMENT input (docref,field*)>
010    <!ATTLIST input
011    type (pcml | xml | all) #IMPLIED
012    >
013    <!ELEMENT output (docref,field*)>
014    <!ATTLIST output
015    type (pcml | xml | all) #IMPLIED
016    >
017    <!ELEMENT MessageType (#PCDATA)>
```

TABLE II-continued

```
018    <!ATTLIST MessageType
019    proptype CDATA #FIXED "list(pcml;xml;csv)"
020    default CDATA #IMPLIED
021    label CDATA #FIXED "Message Type"
022    >
023    <!ELEMENT DQSendKeyed (#PCDATA)>
024    <!ATTLIST DQSendKeyed
025    proptype CDATA #FIXED "list(yes;no)"
026    default CDATA #IMPLIED
027    label CDATA #FIXED "Keyed Send Queue?"
028    >
029    <!ELEMENT DQSendKey (#PCDATA)>
030    <!ATTLIST DQSendKey
031    proptype CDATA #FIXED "string"
032    default CDATA #IMPLIED
033    label CDATA #FIXED "Send Queue Key"
034    enabledBy CDATA #FIXED "DQSendKeyed(yes)"
035    >
036    <!ELEMENT DQSendQueueName (#PCDATA)>
037    <!ATTLIST DQSendQueueName
038    proptype CDATA #FIXED "string"
039    default CDATA #IMPLIED
040    label CDATA #FIXED "Send Queue Name"
041    >
042    <!ELEMENT DQSendLibrary (#PCDATA)>
043    <!ATTLIST DQSendLibrary
044    proptype CDATA #FIXED "string"
045    default CDATA #IMPLIED
046    label CDATA #FIXED "Send Queue Library"
047    >
048    <!ELEMENT system (#PCDATA)>
049    <!ATTLIST system
050    proptype CDATA #FIXED "string"
051    default CDATA #FIXED "localhost"
052    label CDATA #FIXED "Send-Receive Queue System"
053    >
054    <!ELEMENT userid (#PCDATA)>
055    <!ATTLIST userid
056    proptype CDATA #FIXED "string"
057    default CDATA #FIXED ""
058    label CDATA #FIXED "Send-Receive Queue Userid"
059    encrypt CDATA #FIXED "yes"
060    >
061    <!ELEMENT password (#PCDATA)>
062    <!ATTLIST password
063    proptype CDATA #FIXED "string"
064    default CDATA #FIXED ""
065    label CDATA #FIXED "Send-Receive Queue Password"
066    encrypt CDATA #FIXED "yes"
067    keyfield CDATA #FIXED "userid"
068    >
069    <!ELEMENT DQReceiveKeyed (#PCDATA)>
070    <!ATTLIST DQReceiveKeyed
071    proptype CDATA #FIXED "list(yes;no)"
072    default CDATA #IMPLIED
073    label CDATA #FIXED "Keyed Receive Queue?"
074    >
075    <!ELEMENT DQReceiveKey (#PCDATA)>
076    <!ATTLIST DQReceiveKey
077    proptype CDATA #FIXED "string"
078    default CDATA #IMPLIED
079    label CDATA #FIXED "Receive Queue Key"
080    enabledBy CDATA #FIXED "DQReceiveKeyed(yes)"
081    >
082    <!ELEMENT DQReceiveQueueName (#PCDATA)>
083    <!ATTLIST DQReceiveQueueName
084    proptype CDATA #FIXED "string"
085    default CDATA #IMPLIED
086    label CDATA #FIXED "Receive Queue Name"
087    >
088    <!ELEMENT DQReceiveLibrary (#PCDATA)>
089    <!ATTLIST DQReceiveLibrary
090    proptype CDATA #FIXED "string"
091    default CDATA #IMPLIED
092    label CDATA #FIXED "Receive Queue Library"
093    >
094    <!ELEMENT DQReceiveWaitTime (#PCDATA)>
095    <!ATTLIST DQReceiveWaitTime
096    proptype CDATA #FIXED "string"
097    default CDATA #IMPLIED
```

TABLE II-continued

```
098    label CDATA #FIXED "Receive Queue Wait Time"
099   >
100   <!ELEMENT pcmldocument (#PCDATA)>
101   <!ATTLIST pcmldocument
102     proptype CDATA #FIXED "file"
103     default CDATA #IMPLIED
104     label CDATA #FIXED "PCML Document"
105     enabledBy CDATA #FIXED "MessageType(pcml)"
106   >
107   <!ELEMENT docref (#PCDATA)>
108   <!ELEMENT field (field*)>
109   <!ATTLIST field
110     ref CDATA #REQUIRED
111     display (yes | no) #REQUIRED
112     label CDATA #IMPLIED
113     type (char | int | packed | zoned | float | byte | struct) "char"
114     length CDATA #IMPLIED
115     precision CDATA #IMPLIED
116     repeating (Yes | No) "No"
117     countfield CDATA #IMPLIED
118     default CDATA #IMPLIED
119   >
```

A business partner or customer who desires to create an instance of the queue application access method 414c to pass a message to their application must define queue identification information and has a choice of specifying the message format as an XML document or as a structured buffer with PCML.

Java Access Method: The Java access method 414a is used to call a user written Java method that in turn can call other Java programs (local or remote) or access local or remote databases. The data available to this Java method (i.e., the method called by the Java access method 414a) may be defined by either a PCML or XML document, for example. The Java access method 414a is a special case access method that is different from the access methods 414b and 414c described above. The access methods 414b and 414c "drive" the mappings for applications and then invoke the back-end application 412 with a fully-resolved parameter list. This design is successful for those access methods 414b and 414c because they provide a consistent, generic way to describe the application interface (either via PCML and/or XML). For the Java access method 414a, this technique does not work because the Java parameters may be objects. Objects are more complex and do not facilitate a consistent generic way to describe the application interface such that all the diverse parameters types could be built.

Thus, the Java access method 414a invokes a method that implements a specific Java interface (referred to as the "JavaConnectorInterface"). The method (herein referred to as the "Interface Method") that implements the interface then performs a set of functions allowing it to build the parameters to the targeted back-end application 412. Each Interface Method is configured with very specific "knowledge" of the interface to the targeted back-end application 412. The JavaConnectorInterface will pass in an Object (ConnectorParms) to the Interface Method that will contain methods allowing the Interface Method to get runtime data from/to the request/response messages. The properties for one embodiment of a Java access method 414a are shown in Table III.

TABLE III

```
001   <!ELEMENT connector (properties,input,output)>
002   <!ATTLIST connector
003     type NMTOKEN #FIXED "Java"
004     name CDATA #REQUIRED
005   >
```

TABLE III-continued

```
006   <!ELEMENT properties (classname,pcmldocument)>
007   <!ELEMENT classname (#PCDATA)>
008   <!ELEMENT pcmldocument (#PCDATA)>
009   <!ELEMENT input (alias*)>
010   <!ATTLIST input
011     type (pcml) #REQUIRED
012   >
013   <!ELEMENT output (alias*)>
014   <!ATTLIST output
015     type (pcml) #REQUIRED
016   >
017   <!ELEMENT alias EMPTY>
018   <!ATTLIST alias
019     ref CDATA #REQUIRED
020     display (yes | no) #REQUIRED
021     label CDATA #IMPLIED
022   >
```

"Class name" contains the name of the Java class that implements the abstract interface that is defined. The PCML document contains a document that provides the interface specification for the target Java method. The Java access method 414a utilizes an interface class to describe the interaction between the Java access method 414a and a Java method. An illustrative interface class definition is shown in Table IV.

TABLE IV

```
001   public interface JavaConnectorInterface {
002      public JavaConnectorResult run (ConnectorParms parameters,
         String 003 PCMLDocName);
004   }
005
006   public class JavaConnectorResult {
007      public int returncode;
008      public String returnstring;
009   }
```

An embodiment of the Java method that implements the Java connector interface is shown in Table V.

TABLE V

```
001   public class GeneralConnector implements
         JavaConnectorInterface {
002      public JavaConnectorResult run (ConnectorParms parms, String
003      PCMLDocName {
004         /* get the list of input fields */
005         fields = parms.getinputfieldlist( );
006         for (/* each field in the fieldlist */) {
007            /* repeat following section for each field data type */
008            {
009               / * get the field value by passing in the name attribute in
010                  the field list entry; data type for field will correspond
011                  to data type specified in the field list entry */
012               / * an array of values is returned */
013               For (/*each value in the arrays returned*/)      {
014                  /* use the value to set a parameter that will be passed
015                     to    the target backend application */
016            }
017
018         } /* end for */
019         /* invoke the real back-end application */
020         /* get the list of output fields */
021         fields = parms.getoutputfieldlist( );
022         for (/* each field in the fieldlist */) {
023            for (/*loop if multiple values */) {
024               /* get value generated by target application */
025               /* use value to update the field identified by the name
026                  attribute in the field list entry */
027            }/* end for */
028         } /* end for */
029      }
030   }
```

Specification Development

A complete specification for servicing a given type of B2B request using one or more of the existing business application 412 is provided by a specification suite 415. The specification suite 415 is a collection of specification artifacts comprising Application Connector Documents (ACD) 416, Process Flow Models (PFM) 418 and Request/Response Message Formats (RMF) 420.

ACDs, PFMs, and RMFs may be created by a variety of methods and entities. In one embodiment, the supplier system 304 includes a tool suite 413 adapted to create one or more of the artifacts included in the specification suite 415. The following description further describes aspects of ACDs, PFMs, and RMFs and describes embodiments for their creation.

ACD: An ACD 416 provides an abstract and reusable interface definition for a particular business application 412. A given ACD is unique to a particular application 412 provides the back-end flow manager the format of the messages and parameters the application 412 expects. Accordingly, the ACD enables use of that application 412 to service one or more types of B2B requests. To that end, an ACD describes an access method instance. An "instance" is the coupling of an access method 414 with a description of the data to be processed by that access method 414, i.e., data passed to an application 412 or placed on the queuing mechanism 410. The "description of the data" includes the format of the messages and parameters expected by an application 412. One or more access method instances can be created for each access method 414.

In one embodiment, ACDs 416 are XML documents that adhere to the Document Type Definition (DTD) defined for the appropriate access method 414. An ACD DTD exists for each of the supported access methods 414. An ACD for the Java access method 414a and the program call access method 414b indicate the name of the class or program to be called and a description of the parameters the access method expects to be passed. An ACD for the queue access method 414c indicates the name of the queue to use and the format of the message to place on that queue.

In a particular embodiment, each ACD includes an ACD name, a type of ACD (i.e., the access method 414 this ACD is associated with), specific properties of the application 412 being accessed (such as system name, user-id and password to use), and the name of documents (referred to herein as input/output documents) that describe the input and output data for the application 412. Illustratively, the input/output documents are PCML or XML documents and may be created using an editor or authoring tool.

Figure 5:
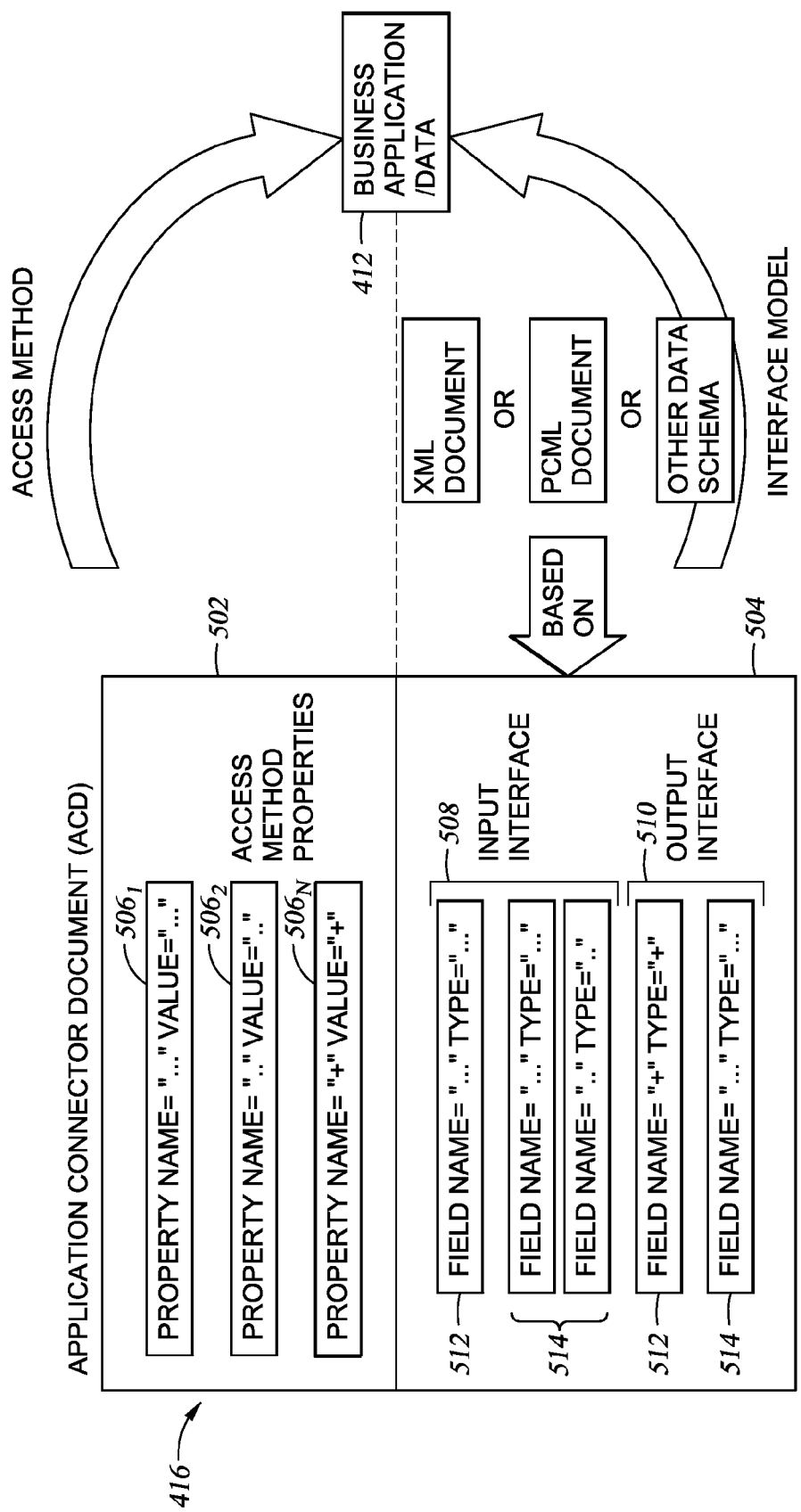
FIG. 5 shows an exemplary Application Connector Document.

An exemplary ACD 416 is shown in FIG. 5. The ACD 416 defines an encapsulation of a business application 412 or data source by defining both access method properties 502 and an interface model 504. The access method properties 502 describe how to access the application 412 and the interface model 504 describes what the application 412 expects for input and output. Further, the access method properties are information needed by the particular access method at runtime to invoke a target application. Illustratively, a plurality of properties $506_1, 506_2, \ldots 506_N$, are shown, each comprising a name-value pair. The interface model 504 comprises an input interface 508 and an output interface 510. Each interface 508, 510 comprises a plurality of fields 512 and subfields 514 each, in turn, comprising a name-type pair. In general, the interfaces 508, 510 may be a suitable data schema 512 selected according to the application 412 to be accessed. Illustratively, the interfaces 508, 510 are XML documents or PCML documents.

Illustratively, an ACD can specify default values for fields, hide/expose selected fields from/to a user during flow mapping (described in more detail below) and provide alias names for fields. A default value can be used for the contents of a field in the case where explicit mapping is not done as part of the mapping rules in a PFM 418. For example, a default value of 1 could be assigned to the quantity field for a purchase order item, for use when a specific quantity was not supplied with the purchase order request data. The ACD specifies for each field whether the field will be hidden from a user so as not to be confusing to the user. Thus, an ACD allows control over what portions of an application's interface are exposed (i.e., displayed for mapping purposes) in a graphical user interface (GUI). In one embodiment, if a field is to be exposed, alias names are provided for fields within the input/output documents that are modified at runtime (from data received in requests). The alias names provide a convenient expression of fields which is more intuitive than the original format defined by an application. These more intuitive alias names may then be used to advantage in the creation of PFMs 418.

Development of an ACD for a particular application 412 may typically be done by a provider of a given application 412 or a business partner. Alternatively, it may be done by a service provider during configuration of a supplier's B2B software environment. Although an ACD can be manually created (e.g., using a text editor or XML editor), one embodiment provides an ACD Creation tool 424 (a component/function of the Business Process Editor 413B) to facilitate creation of ACDs. Regardless of the manner of creation, a completed ACD is then used for flow mapping. In one embodiment, the mapping rules are defined by a Process Flow Model (PFM) and a single ACD can be reused in multiple PFMs.

One embodiment of an ACD (formatted as an XML document) for a PCML-based program call access method 414a is shown in TABLE VI.

TABLE VI

| | |
|---|---|
| 001 | <?xml version="1.0" encoding="UTF-8"?> |
| 002 | <!DOCTYPE connector SYSTEM |
| 003 | "file://localhost/C:/B2BDTD/PgmConnector.dtd" > |
| 004 | <connector name="OrderEntry" type="programcall"> |
| 005 |   <properties> |
| 006 |     <system>rchas001</system> |
| 007 |     <userid>rstevens</userid> |
| 008 |     <password encrypt=yes>pwval</password> |
| 009 |     <pcmldocument>orderentrypgm</pcmldocument> |
| 010 |   </properties> |
| 011 |   <input type="pcml"> |
| 012 |     <docref>orderentrypgm</docref> |
| 013 |     <field display="yes" name="Item Number" ref="xyz.inum"/> |
| 014 |     <field display="yes" name="Item Quantity" ref="xyz.q" default="1"/> |
| 015 |   </input> |
| 016 |   <output type="pcml"> |
| 017 |     <docref>orderentrypgm</docref> |
| 018 |     <field display="yes" name="Item Price" ref="xyz.p"/> |
| 019 |   </output> |
| 020 | </connector> |

RMF: An RMF 420 provides an interface definition of a message format for a given B2B request type (e.g., what are the input and output data flows for the request). In one embodiment, an RMF is an XML document. Regardless of the document type used for an RMF, an RMF generally provides an association (e.g., mapping) between the contents of a request and definitional information provided by the RMF. The association is then used to advantage by access methods 414 which access request and response information contained in the RMF without knowing the physical location of each field in a protocol-specific request. During retrieval and update operations the physical location of data is resolved from an RMF name field by the flow manager 408.

Another feature of an RMF is filtering. Filtering refers to providing a view of or subsetting the complete data structure defined for a given B2B protocol. Some B2B protocols define a single request/response data schema for all types of requests supported by the protocol. cXML is an example of a protocol where a single XML DTD is used to describe data associated with all of the requests supported within the protocol. This places a burden on the business application which must determine which fields out of the overall data structure apply to each type of request. To obviate this need, a separate RMF may be defined for each request within a given protocol. The RMFs are configured to identify the specific set of elements and attributes within a given B2B schema that are used to service a particular type of B2B request. For example, the RMF for a purchase order request defines only the fields that apply to a purchase order request and does not include fields associated with other types of requests. In the case of XML-based message formats, a RMF may identify the XML DTD or schema associated with the request type and the subset of fields defined by the DTD or schema that are applicable for B2B requests of this type. Accordingly, RMFs eliminate the need to understand (by an application owner attempting to integrate existing applications with various request formats) which subset of a given request/response data structure applies to each type of request and simplifies the task of extending an existing business application to handle new B2B requests. Unlike back-end applications 412, which may require the knowledge of the owner to gain access, request/response message protocols are widely known (that is, generally known to the public). Thus, RMFs 420 for each B2B response/request type may be provided to the supplier system from a third party that need not be familiar with the implementation of the supplier system 304.

Figure 6:
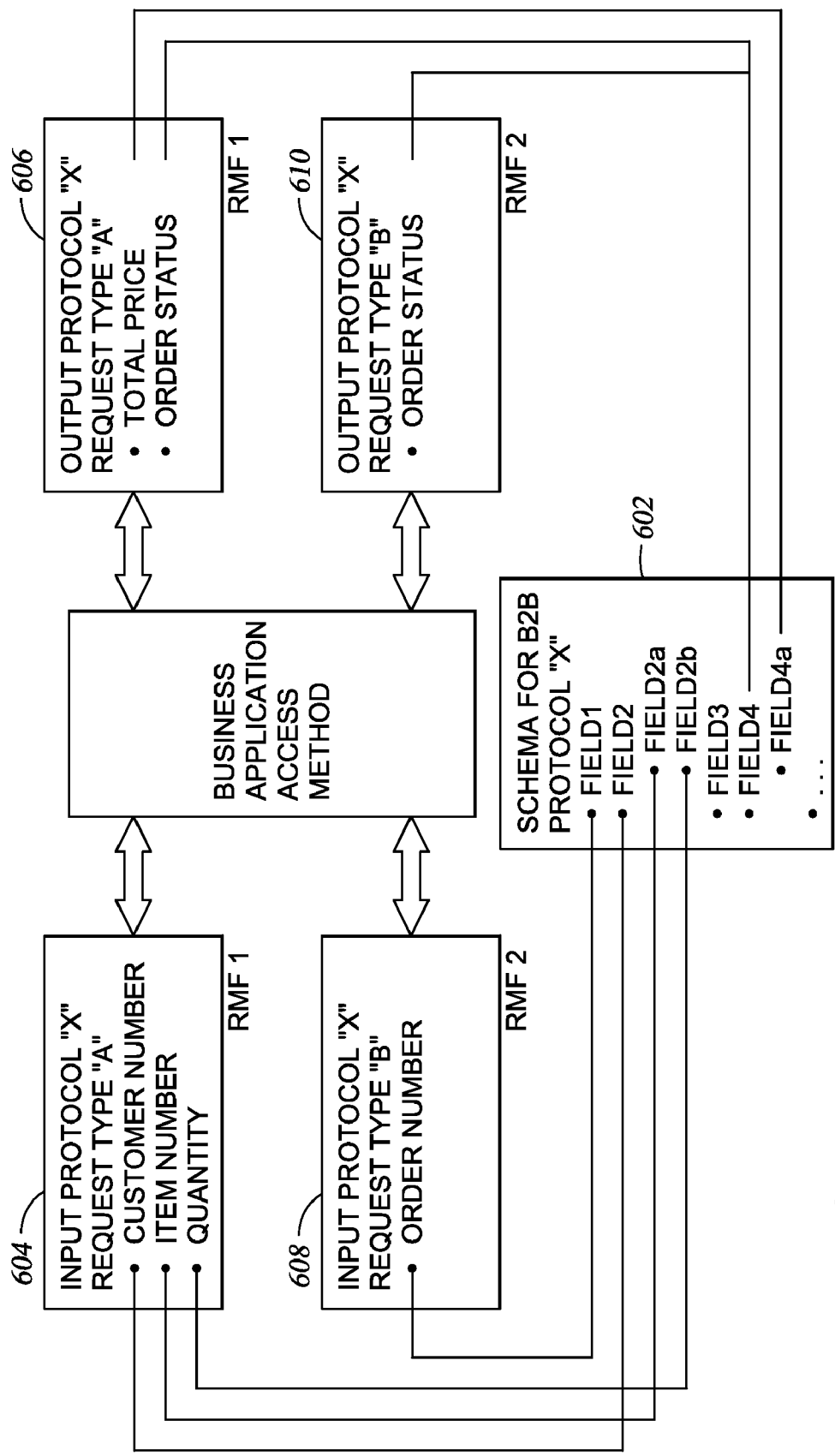
FIG. 6 shows a relational diagram of two request message formats and an access method for an application.

FIG. 6 shows a diagram illustrating the structure of two RMFs and their relationship to a business application access method in order to allow for data interchange within a particular B2B protocol context. A schema 602 for an illustrative protocol "X" includes a plurality of Fields 1-4 and Sub-fields 2a-2b and 4a. A first RMF (RMF1) and a second RMF (RMF2) are configured to define particular request types for the protocol "X". In this case, the first RMF is defined for a request type "A" and the second RMF are defined for a request type "B". Illustratively, the protocol "X" may be cXML and the request type A is a purchase order while the request type B is a order status inquiry. The first RMF comprises input definition 604 and output definition 606. Similarly, the second RMF comprises input definition 608 and output definition 610. Each of the input/output definitions map to the appropriate fields and sub-fields of the protocol schema 602. In this manner, a plurality of RMFs may be provided for a single B2B schema.

In one embodiment, RMFs also allow more meaningful and intuitive field names to be associated with elements in a B2B request/response. Such a configuration provides a format more understandable to personnel provided with a B2B request/response, thereby facilitating the process of mapping a request/response to/from an existing business application 412. Additionally, RMFs may allow for the definition of a default value to be used for an output field in cases where explicit mapping is not as part of the explicit mapping rules in the PFM 418.

Table VII shows one embodiment of an XML DTD which serves as the template for an RMF. Key elements defined in the RMF DTD (Table VII) are described in Table VIII.

TABLE VII

| | |
|---|---|
| 001 | <!ELEMENT protocolmessageformat 002 |
| | (protocol,requestschema,responseschema)> |
| 003 | <!ATTLIST protocolmessageformat |
| 004 | version (1.0) #REQUIRED |
| 005 | > |
| 006 | <!ELEMENT protocol EMPTY> |
| 007 | <!ATTLIST protocol |
| 008 | name CDATA #REQUIRED |
| 009 | protocolversion CDATA #REQUIRED |
| 010 | transactiontype CDATA #REQUIRED |
| 011 | transactionsubtype CDATA #IMPLIED |
| 012 | > |
| 013 | <!ELEMENT requestschema (field*)> |
| 014 | <!ATTLIST requestschema |
| 015 | type (DTD) #REQUIRED |
| 016 | name CDATA #REQUIRED |
| 017 | > |
| 018 | <!ELEMENT responseschema (field*)> |
| 019 | <!ATTLIST responseschema |
| 020 | type (DTD) #REQUIRED |
| 021 | name CDATA #REQUIRED |
| 022 | > |
| 023 | <!ELEMENT field (field*)> |
| 024 | <!ATTLIST field |
| 025 | ref CDATA #REQUIRED |
| 026 | name CDATA #IMPLIED |
| 027 | default CDATA #IMPLIED |
| 028 | count (multiple | one) "one" |
| 029 | > |

TABLE VIII

| RMF Element | Description |
|---|---|
| Protocol | Identifies the protocol/transaction/subtype combination this RMF is associated with. |
| Requestschema | Identifies the schema which describes the format of request data for this protocol/transaction. In one embodiment, schemas defined by XML DTDs are supported. |
| Responseschema | Identifies the schema which describes the format of response data to be generated for this protocol/transaction. |
| Field | Used to identify the fields in the request and response schema for this protocol/transaction that are available for use in mapping to the various ACDs that are defined to handle a given B2B request. Also allows an alternative name to be associated with this field. <field> elements may be nested to reflect the hierarchical nature of the request and response formats supported by various B2B protocols. |

Table IX provides an example of an RMF. Illustratively, Table IX illustrates how a monetary amount may be represented in an RMF. In this case, money is qualified by a given currency and can also be represented in a different amount in another currency. In one embodiment, key components of an RMF field include label, ref, and context. "Label" is the abstract name by which access methods and the flow manager 408 refer to a given request or response field. Label also serves as the name of the field exposed to users through various tools, allowing a more intuitive name to be used for fields that are poorly named or described. "Ref" is the actual, physical location of the field within the request or response data structure supported by a given request type. "Context" indicates whether the field is part of the request or response data structure for the request type.

TABLE IX

```
001   <field context="Request" count="one" label="Money" ref
002   ="/cXML/Request/OrderRequest/OrderRequestHeader/
          Shipping/Money">
003   <field context="Request" count="one" label="@currency" ref
004   ="/cXML/Request/OrderRequest/OrderRequestHeader/
          Shipping/Money/@currency"/>
005   <field context="Request" count="one"
006   label="@alternateAmount" ref
007   ="/cXML/Request/OrderRequest/OrderRequestHeader/
          Shipping/Money/@alternateAmount"/>
008   <field context="Request" count="one"
009   label="@alternateCurrency" ref
010   ="/cXML/Request/OrderRequest/OrderRequestHeader/
          Shipping/Money/@alternateCurrency"/>
011   </field>
```

Table X provides RMFs supported in one embodiment. Illustratively, only Ariba and Metiom message formats are shown. However, any number of RMFs may be supported.

TABLE X

| | Ariba cXML message format | Metiom mXML message format |
|---|---|---|
| Retrieve Server Capabilities | ProfileRequest Response = ProfileResponse | N/A |
| New Purchase Order | OrderRequest with type = new Response = Response | PurchaseOrderMessage Response = PurchaseOrder-Acknowledgement-Message |
| Change Purchase Order | OrderRequest with type = update or delete Response = Response | PurchaseOrderChangeRequest-Message Response = PurchaseOrderChangeRequest-AcknowledgementMessage |
| Remote Catalog Shopping Request | PunchOutSetupRequest with type = create, edit, inspect Response = PunchOutSetupResponse | N/A |
| Shopping Basket Content | PunchOutOrderMessage | OrderRequestMessage |
| Invoice | N/A | InvoiceMessage |

PMF: Once an ACD has been defined for an application and an RMF provided for a given B2B request type, they can be referenced by a PFM 418 which serves to map a particular type of B2B request to the application(s) which will be used to service these requests. Thus, a PFM defines the specific data flow and control flow semantics required to service a particular B2B request type using one or more business applications described by ACDs. In one embodiment, a PFM is an XML document which defines 1) the B2B protocol and type of request to be handled, 2) the business application(s) to be used to service the request (specified by an ACD 416), 3) rules for mapping data provided with the B2B request to input parameters supported by the servicing application(s) and 4) rules for mapping output data generated by the application(s) into the response message format prescribed by the particular B2B protocol/request type. A PFM and the ACDs referenced by a PFM provide a complete specification of the business applications 412 that are defined to service a particular class of B2B request and rules denoting how data is to be mapped between the formats provided with the B2B request to the formats supported by the servicing business applications.

The PFMs 418 may be created by the creator of the ACD or others who will include a particular ACD. In one embodiment, the PFM is created using the Process Flow creation tool 426 (a component/function of the Business Process Editor 413B). The Process Flow creation tool 426 helps describe the mapping information by displaying the mappable fields in the incoming transaction requests, as defined by its RMF, and the mappable fields in the ACD and allowing a user to match the appropriate fields together. For example, a user may want to map the "PostalCode" field from the "BillTo/Address" of a cXML "OrderRequest" message to the "ZipCode" parameter of your "New Order" application.

Tables XI and XII show an exemplary schema for a PFM and an example of a model defined for mapping order requests to a program call access method 414*a*, respectively.

TABLE XI

Process Flow Model DTD

```
001   <!ELEMENT processflowmodel
          (protocol,connector,inmap*,outmap*)>
002   <!ELEMENT protocol>
003   <!ATTLIST protocol
004     name CDATA #REQUIRED
005     protocolversion CDATA #REQUIRED
006     transactiontype CDATA #REQUIRED
007     transactionsubtype CDATA #IMPLIED
008
009   >
010   <!ELEMENT connector EMPTY>
011   <!ATTLIST connector
012     acdref CDATA #REQUIRED
013   >
014   <!ELEMENT inmap EMPTY>
015   <!ATTLIST inmap
016     source CDATA #IMPLIED
017     target CDATA #REQUIRED
018     value CDATA #IMPLIED
019   >
020   <!ELEMENT outmap EMPTY>
021   <!ATTLIST outmap
022     source CDATA #REQUIRED
023     target CDATA #REQUIRED
024   >
```

TABLE XII

```
001   <?xml version="1.0" encoding="UTF-8"?>
002   <!DOCTYPE processflowmodel SYSTEM
003   "file://localhost/C:/B2BDTD/ProcessFlowModel.dtd" >
004   <processflowmodel>
005     <protocol name="cXML" protocolversion="1.0"
006     transactiontype="OrderRequest"/>
007     <connector acdref="OrderEntry"/>
008     <inmap source="/ItemOut/ItemID/SupplierPartID"
009     target="Item Number"/>
010     <inmap source="/ItemOut/@quantity" target="Item Quantity"/>
011     <outmap source="Item Price" target="/ItemOut/@price"/>
012   </processflowmodel>
```

Once the ACDs and PFMs are in place, the specification suite 415 is deployed to provide a runtime view of the artifacts. Deployment involves association of a PFM and one or more ACDs and occurs before receiving requests. In operation, the deployment of the specification suite 415 results in runtime metadata 422. In one embodiment, the runtime metadata 422 is an XML document and is structured in such a way as to provide efficient runtime processing. Once generated, the runtime metadata 422 is bound to (or associated with) an instance of a flow manager 408. The runtime metadata 422 may then be used by the flow manager to handle incoming requests and outbound responses of specified types.

There are multiple pieces of information included in the runtime metadata 422. Illustratively, the runtime metadata 422 includes a request to flow mapping, a connector interface specification, a flow and response creating rules. The request to flow mapping uniquely describes the requests that should be handled by a particular process flow. The connector interface specification is the runtime view of the ACD. The flow consists of multiple steps that can be taken when handling a particular request. The flow also describes the field level mapping rules to be applied to each step. The response creating rules are non-protocol specific rules that allow the flow manager 408 to create a valid response document based on the information in the RMF 420.

Figure 7:
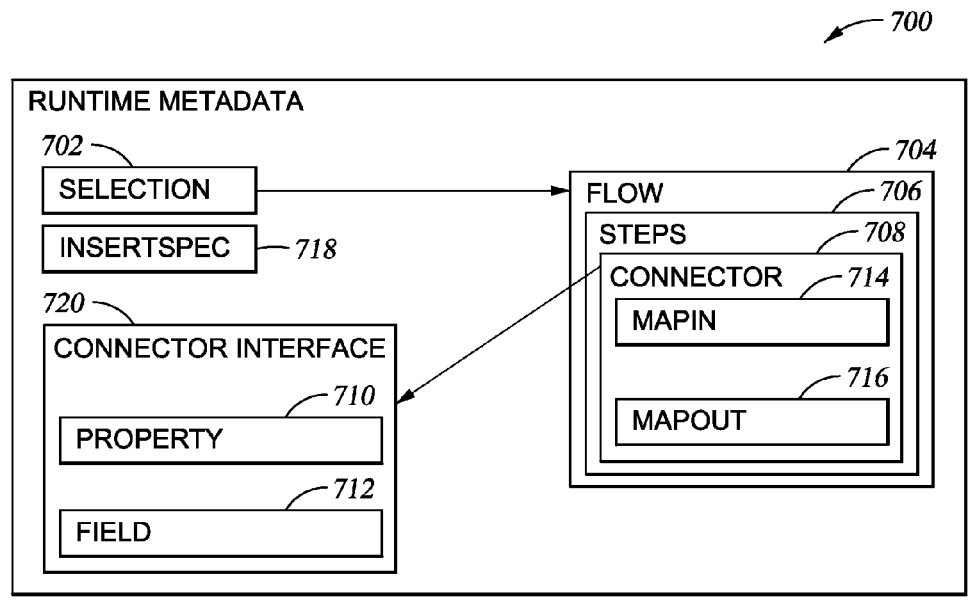
FIG. 7 shows an embodiment of a runtime metadata document.

In one embodiment, the foregoing runtime metadata 422 components are defined as XML elements. FIG. 7 shows a runtime metadata document 700 containing runtime metadata 422 comprising the following XML elements: Selection 702, Flow 704, Steps 706, Connector 708, Property 710, Field 712, Mapin 714, Mapout 716, InsertSpec 718 and ConnectorInterface 720. Arrows denote references from one type of element to another. This represents a relationship between the two elements but does not imply that one element is necessarily contained within another. This allows multiple elements of one type (e.g., the Selection element 702) to reference the same element of another type (e.g., the Flow element 704). In other words, the same Flow element can be used by multiple protocol/request Selections. These elements are described in more detail below with reference to FIG. 11.

To create the runtime metadata 422, one embodiment of the B2B environment 400 provides a process deployment tool 413A. Illustratively, the process deployment tool 413A is a component of the tool suite 413. The process deployment tool 413A may be any tool configured to convert the ACDs and PFMs into a runtime format that can be processed by the flow manager 408. In one embodiment, process deployment tool 413A is accessed from a browser session and allows a B2B request that is to be serviced to be uniquely identified. A request can be uniquely identified by the protocol being used (e.g., cXML, mXML), the marketplace it is received from (e.g., Ariba Network, Joe's Fishmarket), the specific Action/Subaction specified (e.g. OrderRequest), the buying organization submitting the request, and the supplier that this request is targeting. The unique request is then associated with a previously built PFM which identifies the ACD to be used and the field level mappings to take place. In one embodiment, a PFM can reference one ACD and therefore one back-end application 412. In another embodiment, a PFM can reference multiple ACDs which constitute a flow. This information is provided to the flow manager 408 as runtime metadata 422 for real-time processing. At this point, the supplier system 304 is ready to accept requests from various trading partners 302, call the appropriate back-end applications 412 and return responses.

System Operation

Figure 8:
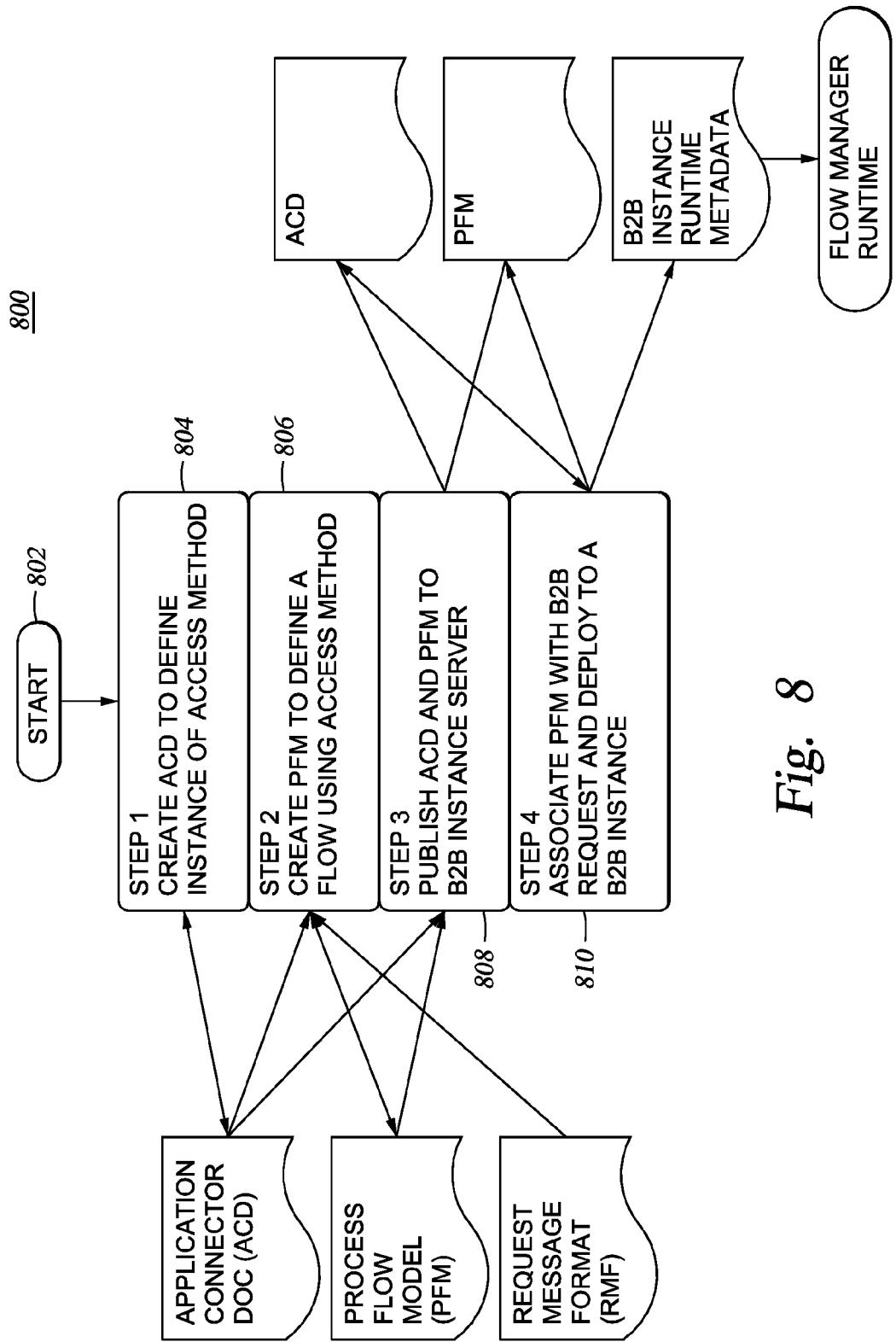
FIG. 8 shows a data flow diagram illustrating development and deployment of specification artifacts.

Development time, deployment and run time may be illustrated with reference to FIGS. 8-12. Referring first to FIG. 8 a method 800 for development and deployment of ACDs, PFMs, and RMFs is shown. To this end, method 800 shows a series of steps and indicates the data structures utilized in the execution of the steps.

Method 800 is entered at step 802 when a user initiates execution of the tools 413. Method 800 then proceeds to step 804 where an ACD is created to define an instance of an access method 414. At step 806, a PFM is created to define a flow using the access method instance. At step 808, the ACD and the PFM are published to (i.e., sent to) a B2B instance server. In one embodiment, steps 804-808 employ the Business Process Editor 413B. At step 810, the PFM is associated with a request type and is then deployed to a B2B instance. That is, a PFM and its associated ACDs are transformed into runtime metadata. In one embodiment, step 810 employs the Process Deployment Tool. The flow manager 408 is now configured with the appropriate runtime metadata to handle a specified request type.

Figure 9:
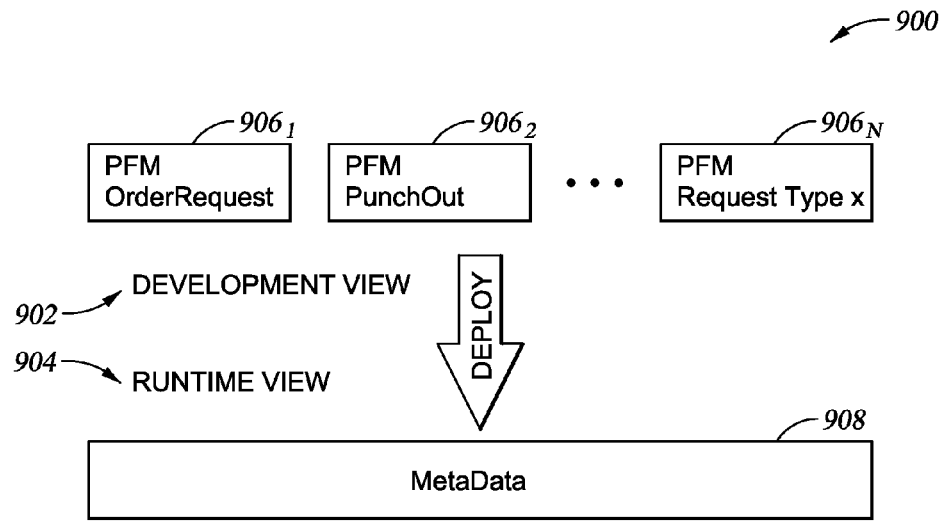
FIG. 9 shows a data flow diagram illustrating deployment of process flow models.

The relationship between PFMs and a FlowMetaData document is further illustrated in FIG. 9. FIG. 9 shows a process flow correlating a development view 902 and a runtime view 904. The development view 902 includes a plurality of PFMs $906_1$, $906_2$, $906_N$..., each PFM being representative of a particular request type. Illustratively, an order request PFM $906_1$ and a punch out PFM $906_2$ are shown. A third PFM $906_N$ indicates that any number of PFMs may be provided for. When deployed, the PMFs produce runtime metadata 908 configured to handle requests received from trading entities (e.g., trading partners).

Figure 10:
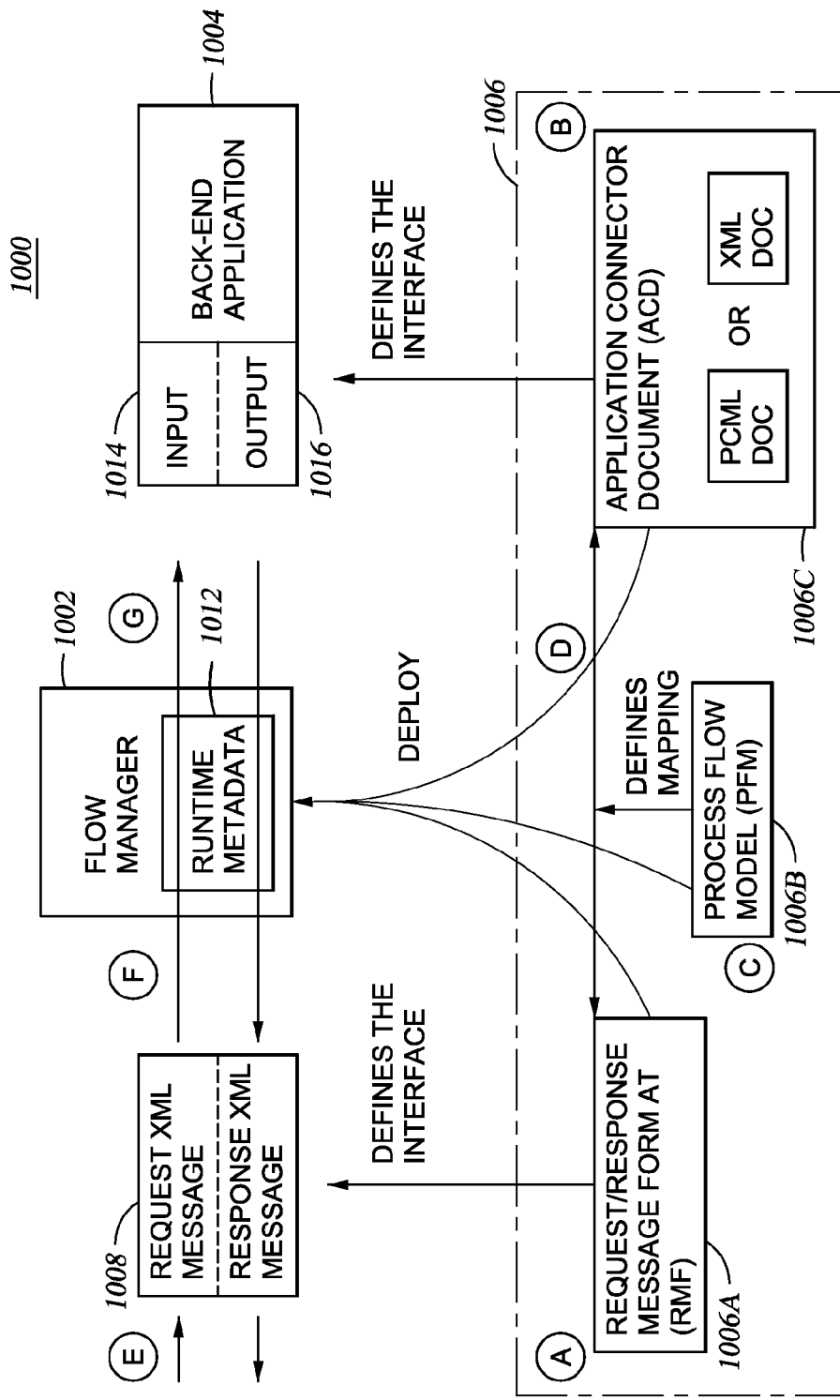
FIG. 10 shows a data flow diagram illustrating deployment of specification artifacts and processing requests.

The overall operation of a B2B environment (such as the B2B environment 400 shown in FIG. 4) may be described with reference to FIG. 10. FIG. 10 shows a supplier system 1000 comprising a flow manager 1002, an application 1004 for servicing incoming requests and providing responses and a plurality of specification artifacts 1006. The specification artifacts 1006 comprise RMFs 1006A, PFMs 1006B and ACDs 1006C. The supplier system 1000 is configured to receive a request and provide an appropriate response to a requesting entity (e.g., a trading partner).

In general, steps 'A-D' represent development and deployment. At step 'A' the appropriate RMF 1006A is identified according to a request protocol to be supported by the supplier system 1000. At step 'B' an ACD 1006C is created to describe the interface to the application 1004. At step 'C' the PFM 1006B correlating the request protocol with the appropriate application 1004 is created. Step 'D' represents deployment at which point runtime metadata is generated from the RMF, PFM and ACD. Step 'D' may be facilitated by a tool, such as the process deployment tool 413A shown in FIG. 4. The supplier system 1000 is now configured to receive requests.

Steps 'E-G' represent processing of a request. A request 1008 is received at step 'E' and provided to the flow manager 1002 at step 'F'. The flow manager 1002 processes the request according to predefined runtime metadata. The runtime metadata describes the sequence of applications to be invoked to handle the request, the access method used to invoke a particular application and how to transform data provided with the request into a format that is supported by each of the applications invoked to handle a request. At step 'G' the application 1004 is invoked to process the request 1008. At this point the request is in a format understandable to the application 1004.

Figure 11:
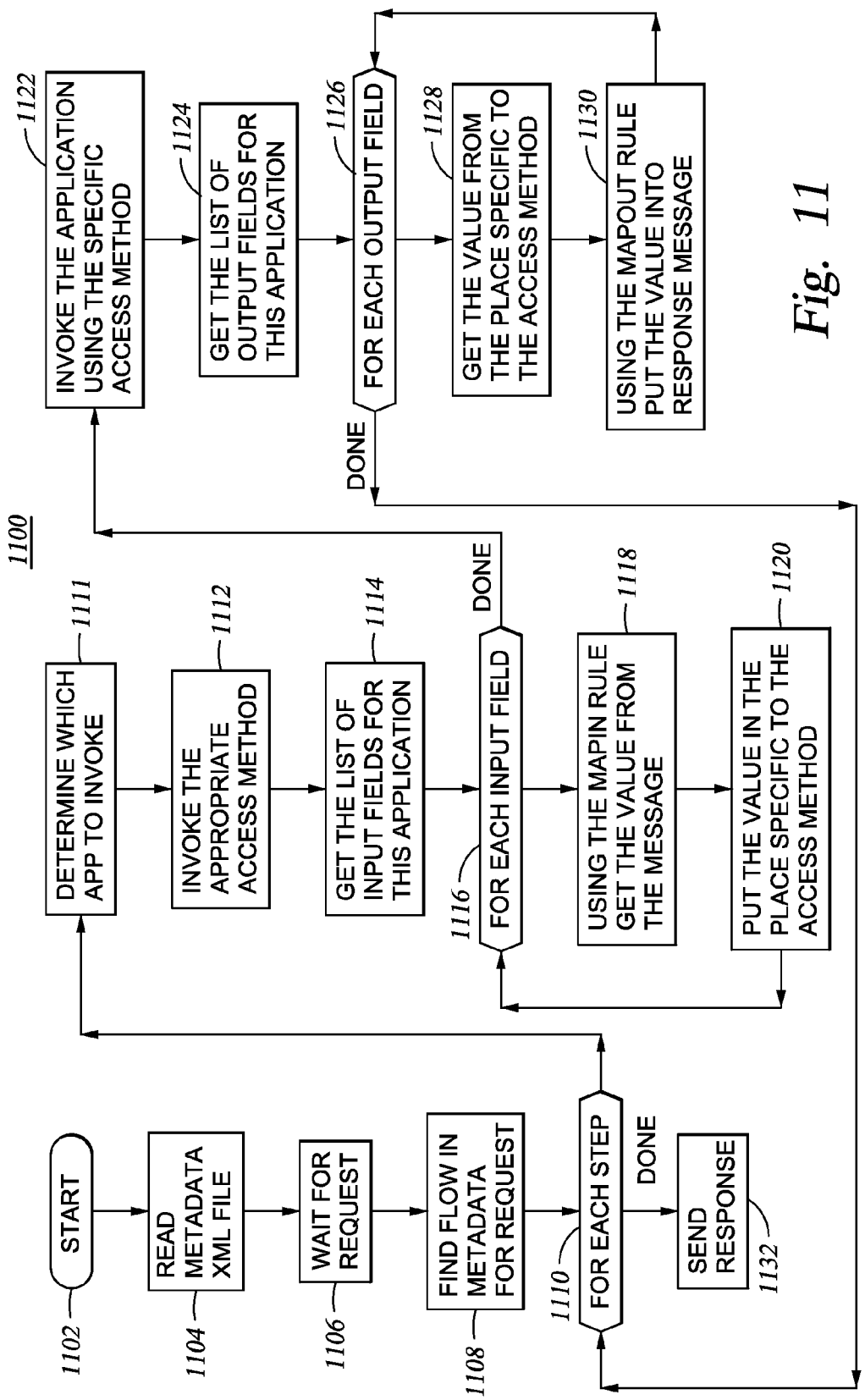
FIG. 11 shows a flow chart of a flow manager configured to handle eCommerce requests.

The operation of the flow manager after being configured with runtime metadata may be illustrated in more detail with reference to FIG. 11 which shows a flow manager method 1100. Reference is also made to FIG. 7 which shows one embodiment a runtime metadata document 700. The method 1100 is entered at step 1102 and proceeds to step 1104 where the back-end flow manager reads a file (e.g., runtime metadata document 700) containing the runtime metadata. At step 1106, the flow manager stands by for a request from the gateway 404. When a request is received, the method takes steps to process the request according to the metadata 422.

At step 1108, the flow manager locates a flow to determine what processing to perform for the request. In particular, the flow manager searches a selection element for a corresponding flow description element (Flow element). A flow description element specifies the set of applications to invoke to perform the processing of the request and the generation of the response. A flow description element contains a sequence of step elements. Each step element represents a description of how to invoke the application and indicates the next step to process after the current step is complete. The flow manager utilizes the step element to invoke the application and to locate the next step element when the current step element is complete. Accordingly, at step 1110, the flow manager enters a loop which is repeated for each step of the selected flow description element.

At step 1111, the flow manager determines which application to invoke according to the selected flow. At step 1112, the appropriate access method 414 for the application is called. The access method 414 is defined by the ConnectorInterface element 720 (which also describes how to invoke the application). The ConnectorInterface element 720 contains the name of a Java class that implements an access method 414, the properties of the access method 414, a set of data about the input fields of an application 412 and a set of data about the output fields of the application 412. The ConnectorInterface is the part of the Connector element 708 that is specific to the application being invoked. It is the Runtime Metadata form of information found in an ACD. A Connector 708 contains a reference to a ConnectorInterface 720. In addition to this reference, a Connector 708 contains mapping rules which describe how data is mapped into and from the referenced ConnectorInterface 720. This allows a given ConnectorInterface 720 (which represents an ACD) to be used by a number of Connector instances, each with a different set of mapping rules targeting the same application. In other words, the same ConnectorInterface 720 can be used by one Connector 708 describing how data from cXML is mapped to the ConnectorInterface 720 and a second Connector 708 describing how mXML data is mapped to the same ConnectorInterface 720. When processing a step element, the flow manager reads the connector element 708 and invokes the access method (Program Call, Queue or Java) implementation that performs the mapping of the data. The access method implementation will use the Property elements 710 to set up the operating environment for the application.

At step 1114, the access method implementation gets a list of input field elements that describe the input parameters (or message fields) that the application requires. At step 1116, the method 1100 enters a process (steps 1118 and 1120) performed for each field element in the list. At step 1118, the access method invokes a Mapin method. The Mapin method will take a Field element and find a corresponding Mapin element. The Mapin element will indicate where the value that this field is looking for is located at (i.e., the field in the request message). The Mapin method will retrieve that value, and perform any data type conversion that is required. Any necessary data type conversion is known because the Field element specifies what data type the application is expecting for this parameter. The Mapin method will return the value from the request message, in the proper data type, to the access method. At step 1120, the access method places the value in the appropriate place for the application to get access to it upon invocation. For example, the program call access method 414B will put the value in memory is a structure that the application will understand. When the program call access method invokes the application, it passes to the application the memory location.

The method 1100 then returns to step 1116 to begin processing the next input field element. In this manner, the access method 414 continues processing Field elements, invoking Mapin methods to extract the values, until all the input Field elements have been processed.

At step 1122, the access method 414 invokes the application in the access method specific technique. For example, the program call access method 414B will call the application passing in the memory location of the parameters, the queue access method 414C will put a message on a queue, etc.

After the application is invoked, the access method 414 gets a list of output Field elements at step 1124. The output field elements provide the location of the output values to be located by the access method. At step 1126, then the access method starts processing the output fields one at a time. At step 1128, the access method then extracts the output value using the technique specific to that access method. Once the value for a field is extracted, the access method will invoke the Mapout method at step 1130. The Mapout method is configured to locate the corresponding Mapout element and the corresponding InsertSpec element. The Mapout element indicates where to store the value in the response message while the InsertSpec element indicates how to insert the value in the response message. The response message has a specific order for the fields that is specific to each B2B protocol. The InsertSpec element contains a specification of the field order of the response message and allows the access method to store output field values in the response message without concern for the order of the fields. Accordingly, the fields can be specified in an order that is independent of the response message. In this way, the Mapout method takes as input the value to store from the access method, then using the Mapout element and InsertSpec element, the Mapout method places the value in the appropriate place in the response message. This process (i.e., steps 1128 and 1130) is repeated for each output field element at which point the access method then returns to the flow manager and the method returns to step 1110.

At step 1110, the flow manager then gets the next step to process from the Step element. When all step elements have been processed, the response message is placed on queue, at step 1132, to send to the gateway 404.

Figure 12:
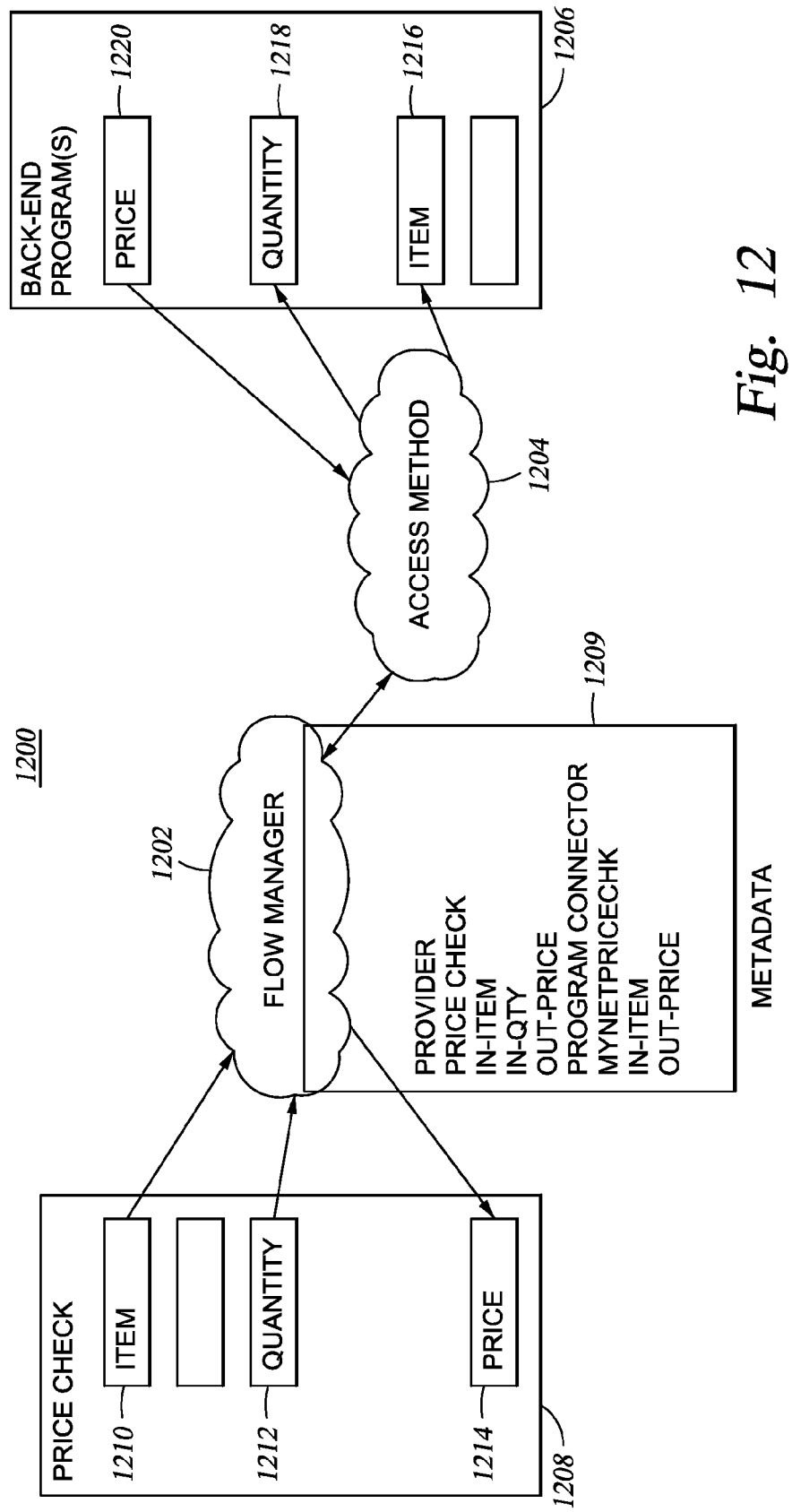
FIG. 12 shows a data flow diagram illustrating a price check.

A particular example of a flow manager operation is described with reference to FIG. 12. FIG. 12 shows supplier system 1200 configured to process a "price check" request. In general, the supplier system 1200 comprises a flow manager 1202, an access method 1204 and an application 1206. Illustratively, the incoming request 1208 is a "price check" formatted according to a protocol that the supplier system 1200 has already been configured to process. To this end, the flow manager 1202 is configured with metadata 1209 used to process the request 1208.

Illustratively, the price check request 1208 includes an item field 1210, a quantity field 1212 and a price field 1214. The application 1206 has a corresponding item field 1216, quantity field 1218 and price field 1220. Upon receiving the request 1208, the flow manager 1202 refers to the metadata 1209 to determine a type/format of the request 1208, find the appropriate fields of the request 1208 to be accessed, call the appropriate access plan 1204, and then return information to fulfill the request 1208.

Tools

As described above, some embodiments employ tools for development and deployment of data structures and other artifacts of a supplier system. The following provides a description of some tools that may be used to advantage. It is understood that the tools described herein are merely illustrative and those skilled in the art will readily identify other methods and tools which may be used to the same end.

FIGS. 13-14 show an embodiment of GUIs for the Business Process Editor Tool (BPET) 413B. In one embodiment, the BPET 413B is a Java GUI tool used to create and update information associated with access method instances (e.g., ACDs) and to create and update business process flow information (e.g., PFMs) designed to handle particular B2B requests. Illustratively, the BPET 413B may be configured to run on either a Windows NT or Windows 2000 client and can be used while connected via a TCP/IP network to the host that supports a B2B instance or in standalone mode where no connection exists to the host containing the supplier system runtime environment. A publish operation may be employed to transfer complete ACD or PFM definitions to a host where it can be deployed to a B2B instance running on that host.

Illustratively, the BPET 413B is presented as a single GUI panel with separate tabs 1302 and 1304 used to navigate from an application access method edit mode to a process flow edit mode. FIG. 13 shows a BPET GUI 1300 when the when an application access method tab 1302 is selected. The application access method edit tab 1302 is used to capture information required to define an instance of an access method 414, including the properties and input/output fields supported by the access method instance. Table XIII shows information which can be specified using this interface.

Table XIV shows illustrative actions that are available as menu options from the BPET GUI 1300 while the application access method tab 1302 is selected and while working with access method instances.

TABLE XIV

| Menu Option | Action |
| --- | --- |
| File -> New | Create a new access method instance definition. Only Name and Access Method will be shown until Access Method is selected. |
| File -> Open . . . | Bring up browse interface to locate pre-existing access method instance file for update. |
| File -> Save | Save changes made to this access method instance. |
| File -> Save As . . . | Bring up browser interface to select file name and location to save this access method instance definition under. |
| File -> Exit | Exit the Business Process Editor. |
| Edit->Cut | Cuts the selected text to the system clipboard. |
| Edit->Copy | Copies the selected text to the system clipboard. |
| Edit->Paste | Pastes current text from a system clipboard to the current cursor location. |
| Publish | Select a host system and B2B instance to send a completed PFM and access method instance definitions to. A publish operation stores the completed PFM and |

TABLE XIII

| GUI Control Name | Description |
| --- | --- |
| Access Method Name | Name associated with this access method instance. Names must be unique since they are used to reference a given access method instance from a business process flow (PFM). |
| Access Method | Defines the type of access method for this access method instance. Specific properties and the type of input/output message formats allowed for the access method instance are defined by the access method. Selection of access method will affect the information presented in the Properties and Documents sections. When editing an existing access method instance definition, the Access Method field will be disabled; thereby preventing a user from changing the access method for an existing access method instance. |
| Properties | Name/value pairs defining information needed by a particular access method to service requests at runtime. The set of name/value properties is specific to each access method type. |
| Documents | Identifies an XML document or PCML document, for example, which defines the input and output fields supported by the individual access method instance. Input document defines the set of fields supported as input to the access method instance. Output document defines the set of fields that are returned by the access method instance. When PCML is used, the same document will typically appear for both input and output. When document type is XML, the element and attribute names defined by the XML document represent the candidate set of fields supported by the access method instance. When the document type is PCML, the data and structure elements defined by the PCML document represent the candidate field set for the access method instance. |
| Field ID | A hierarchical view showing the set of candidate input and output fields supported by the access method instance as defined by the specified input and output documents, respectively. |
| Name | Used to assign a more intuitive name (e.g., an alias) to a particular field defined in either the input or output document for this access method instance. Values specified for Name will be displayed when mapping B2B request fields to access method fields on the Process Flow tab of the Business Process Editor. |
| Default | Used to assign a default value to a particular field. Default value is used if field is not explicitly mapped from data contained in the incoming B2B request. |
| Display | Used to control whether a field is displayed when mapping B2B request data to fields associated with the access method. Deselecting display will cause the field to be treated as "hidden" so that it won't be displayed on the Process Flow tab and cannot be the source or target for data mapped from the B2B request being handled by this access method instance. |

TABLE XIV-continued

| Menu Option | Action |
|---|---|
| | access method instance definition on a B2B server from which it can be deployed to the runtime environment. |
| Help | Brings up online help for the Business Process Editor. |

FIG. 14 shows the BPET GUI 1300 when the when a process flow edit tab 1304 is selected. The process flow edit tab 1304 is used to describe a process flow model, including the type of B2B request to be serviced, the ACD to be invoked to handle the request and information describing how data provided with the B2B request is mapped to input fields supported by the ACD and how data returned by the access method instance is mapped to the response data format supported by the particular B2B request. Illustrative information that can be specified using this interface is shown in Table XV. The menu options for the process flow section of the BPET GUI 1300 are the same as those provided when the application access method tab 1302 is active. (See Table XIV).

TABLE XV

| GUI Control Name | Description |
|---|---|
| Protocol | Allows a user to choose the protocol to be serviced by this process flow definition. |
| Action | The Action dropdown is based on the selected protocol. Allows a user to choose the action to be serviced by this process flow definition. |
| Access Method Name | This dropdown displays the list of available access method instances. Access method instances are defined using the Application Access method tab. Allows a user to choose the access method instance that will be used to handle B2B requests of the specified protocol and action.<br>Once an action and an access method are selected, the Load button is enabled. When the Load button is clicked:<br>I. The Request Fields and Response Fields in the Input Mappings and Output Mappings sections are filled with the fields associated with the chosen protocol/action.<br>II. The Access Method Fields in the Input Mappings and Output Mappings sections are filled with the fields associated with the chosen access method instance. |
| Input Mappings | Shows the set of fields provided with this type of B2B request and the input fields supported by the specified access method instance. User may select a Request Field and an Access Method Field and click Add Mapping to indicate that the Request Field is to be mapped to the selected Access Method Field at runtime. This data mapping association is displayed in the Mapping Table at the bottom of the Business Process Editor screen. |
| Output Mappings | Shows the set of fields returned by the specified access method and the set of fields that make up the response message for this type of B2B request. User may select a Response Field and an Access Method Field and click Add Mapping to indicate that the Access Method Field is to be mapped to the selected Response Field at runtime. This data mapping association is displayed in the Mapping Table at the bottom of the Business Process Editor screen. |
| Mapping Table | This table lists all of the data mappings that have been defined between Request/Response data fields associated with this type of B2B request and the input and output fields associated with the specified access method instance.<br>To remove a mapping from the table, select the row containing the mapping and click Remove.<br>To remove all mappings from the table, click Remove All. A warning message appears to confirm this operation. |

Figure 15:
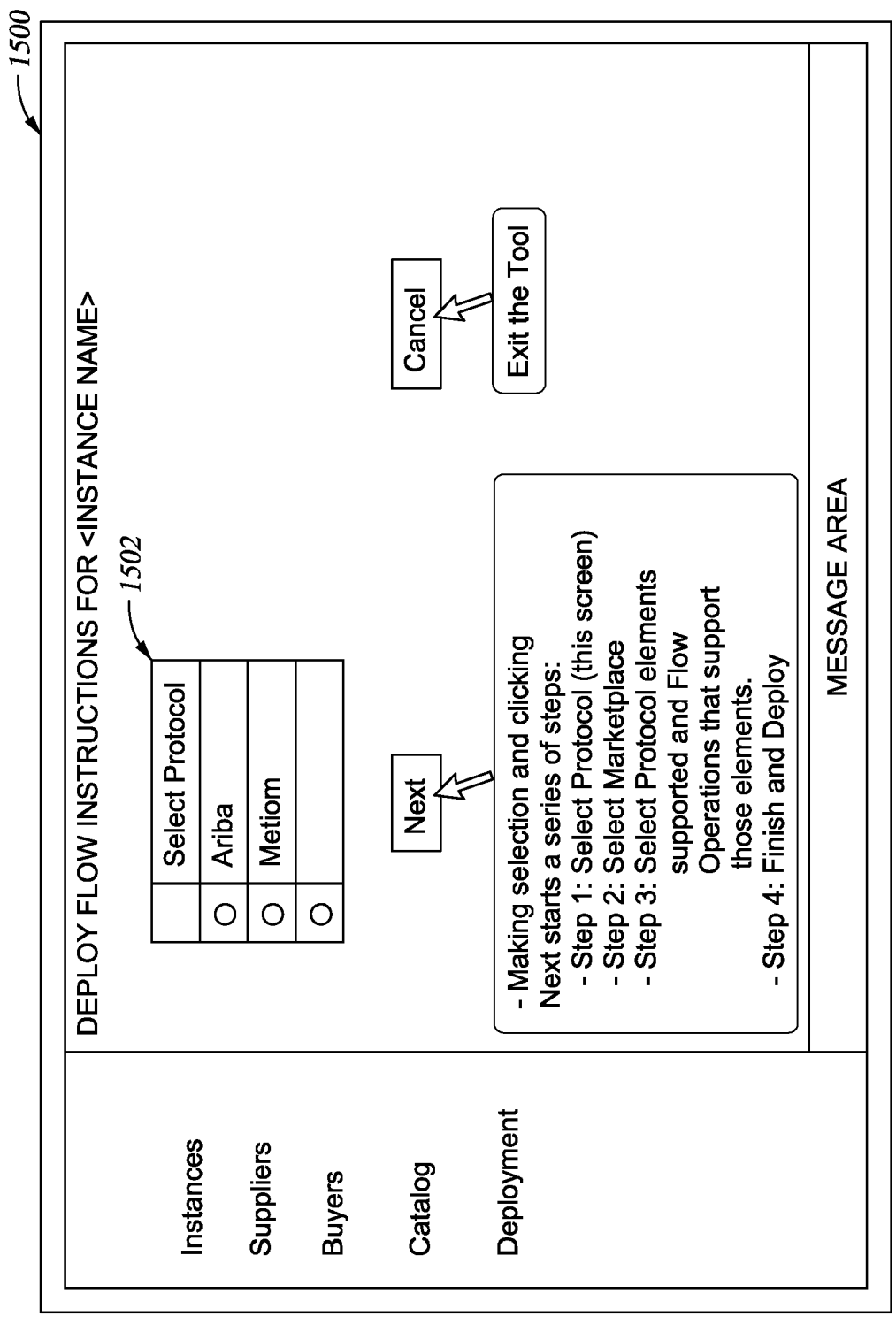
FIG. 15 shows a graphical user interface of a specification deployment tool.
Figure 16:
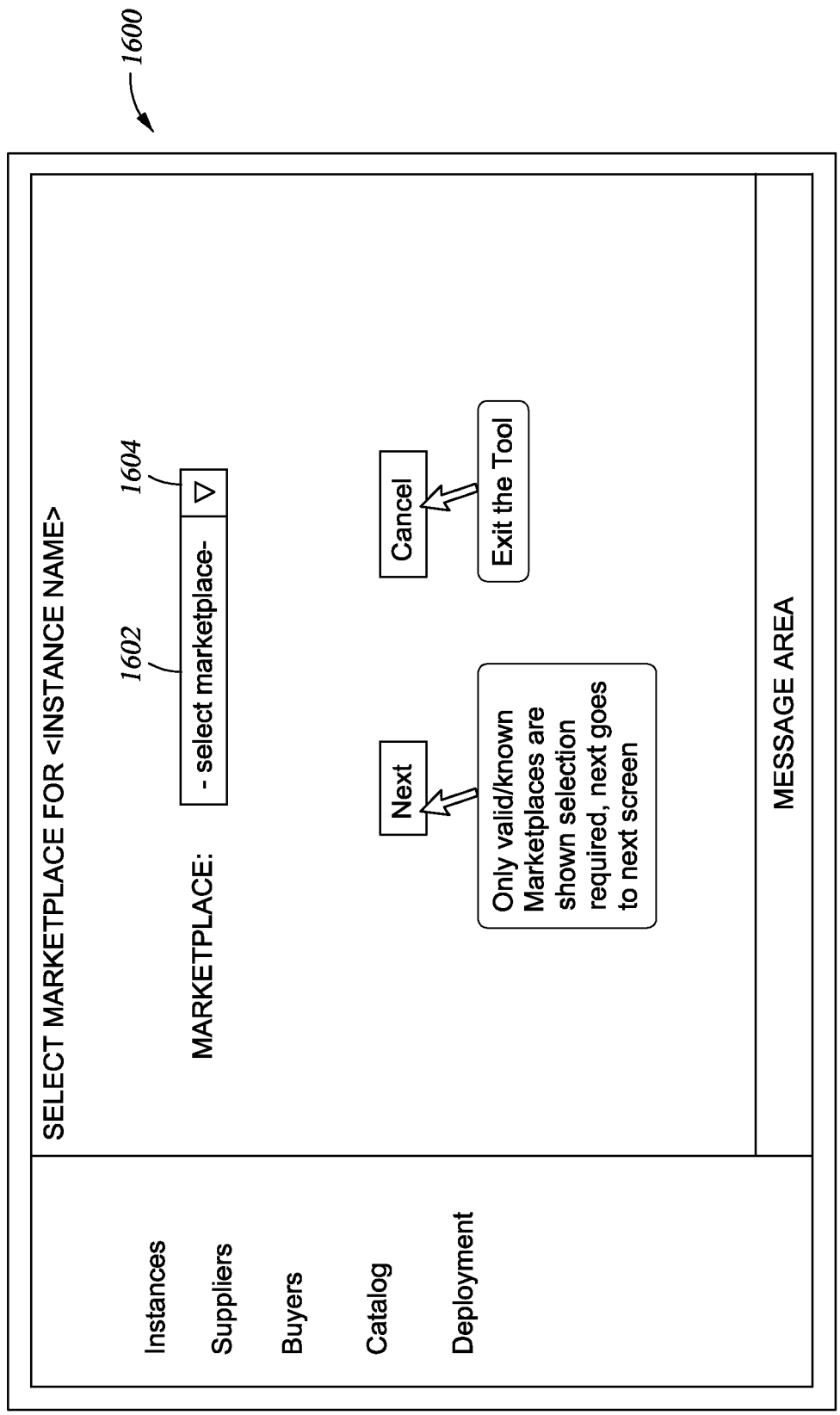
FIG. 16 shows a graphical user interface of a deployment tool.
Figure 17:
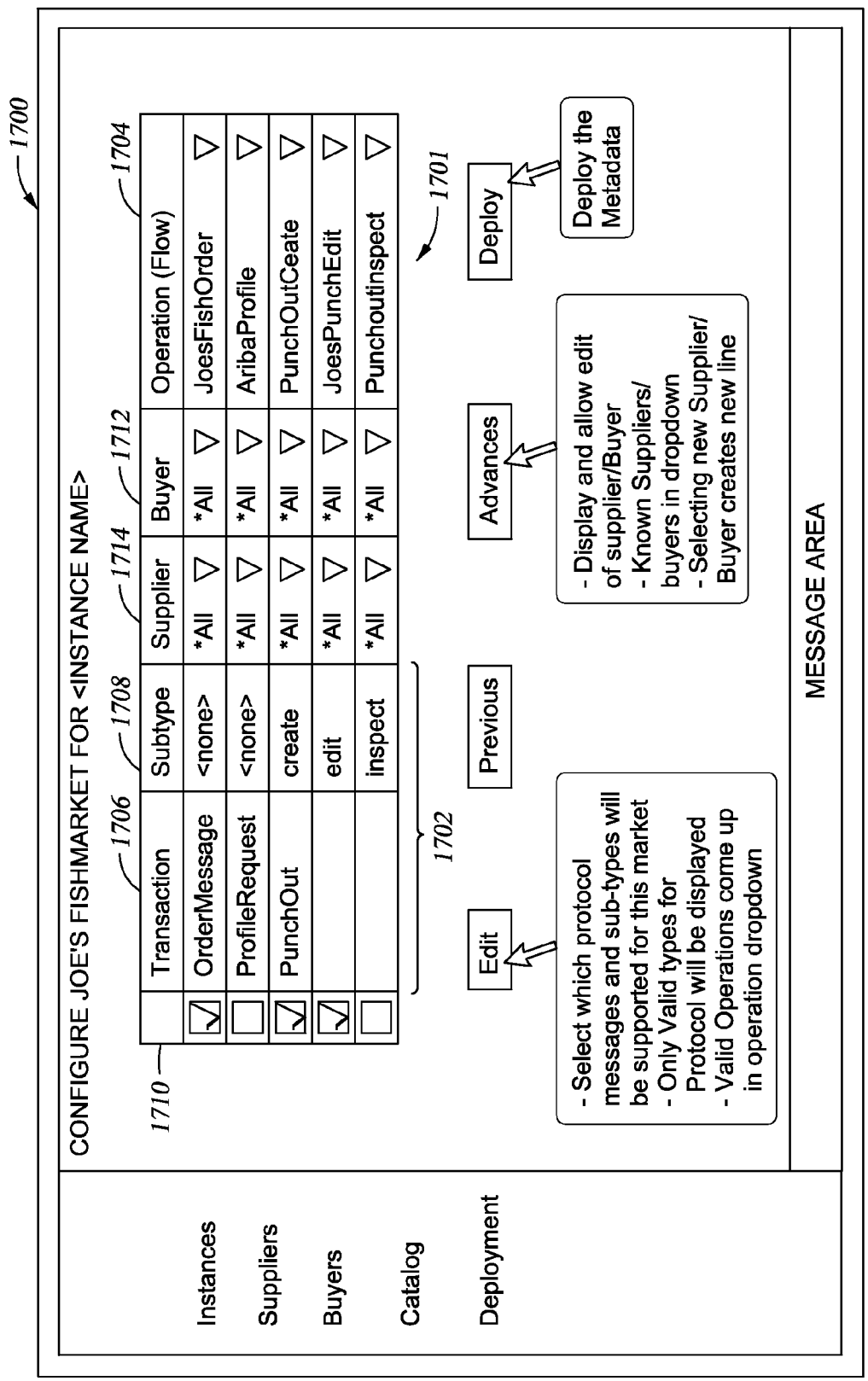
FIG. 17 shows a graphical user interface of a deployment tool.

FIGS. 15-17 show embodiments of GUIs for the Process Deployment Tool (PDT) 413A. Illustratively, the PDT GUIs are web-based interfaces used to deploy a complete business process flow (PFM) and associated access method instance definition (ACD) into the runtime environment supporting a particular instance of a B2B server configured to process B2B requests. The PDT 413A runs within the context of a given B2B server instance, allowing the business process flows defined for that instance to be updated or extended. In essence, the PDT 413A will convert one or more PFM/ACD pairs into the runtime metadata format required by the Flow Manager responsible for handling incoming B2B requests within a given B2B server instance.

A primary task in the deployment process is the association of a particular PFM with the B2B request the flow is designed to service. In one embodiment, requests can be qualified by B2B marketplace, B2B protocol, transaction type and sub-type, buying organization and supplier. Thus, the act of deployment involves (1) user selection of values for all of the B2B request qualifiers (e.g., protocol, protocol version, marketplace, request type, buyer and supplier), (2) user identification of the business process flow (PFM) that will handle these requests, (3) generation of runtime metadata representing these selections and (4) storage of this information in the runtime environment associated with the B2B instance. These four (4) steps are supported by one embodiment of the PDT 413A.

In one embodiment, a wizard-like interface is provided to walk a user through the set of selections required to deploy a new PFM or to view the set of current PFM that are currently defined to a B2B instance. An embodiment of the "wizard-like interface" is illustrated with respect to FIGS. 15-17. A protocol selection screen 1500 of the wizard for the PDT 413A, shown in FIG. 15, allows a particular B2B protocol to be selected. Only those protocols supported by a B2B instance will be shown to the user. Illustratively, a protocol selection window 1502 shows Ariba and Metiom as available protocols.

Clicking on the "Next" button on the protocol selection screen 1500 will bring up a marketplace selection screen where a particular marketplace supporting the chosen protocol can be selected. An illustrative marketplace selection screen 1600 is shown in FIG. 16. Only those marketplaces for the selected protocol will be shown in the marketplace list on this screen. The available marketplaces may be shown by clicking on a dropdown button 1604 of a marketplace selection window 1602.

Once marketplace is chosen, clicking on the "Next" button on the marketplace selection screen 1600 will bring up a market configuration screen. An illustrative market configuration screen 1700 is shown in FIG. 17. The market configuration screen 1700 provides a configuration window 1701 which includes a request list 1702 of B2B requests that are currently supported for the selected marketplace and a PFM column 1704 (titled "Operation (Flow)") identifying the PFM specified to handle each request. For a newly defined marketplace, the request list 1702 initially contains a transaction column 1706 and a subtype column 1708 for the set of B2B transaction types/subtypes defined by the B2B protocol associated with marketplace. Only those transaction types/subtypes enabled for the current B2B instance are shown.

Clicking an "Advanced" button displays a buyer column 1712 and a seller column 1714. The columns 1712 and 1714 provide a list of buying organizations and supplier organizations, respectively, that are authorized to conduct commerce within a given marketplace. Accordingly, association of PFMs specific to a given buyer/supplier relationship is provided, thereby allowing definition of one PFM for one buyer/supplier pair and another PFM for another buyer/supplier pair. For example, one PFM may be defined for a large corporate buyer and another PFM may be defined for a sole proprietor.

In one embodiment, the buyer and supplier settings will be defaulted to *ALL, and the corresponding PFM entry in the PFM column 1704 will be empty since no business process flows have yet been identified to handle B2B requests from this marketplace. Defaulting to *ALL means the specified PFM will apply to request associated with all buyers and all suppliers.

From this initial screen, the user may select a PFM from the PFM column 1704 to handle a given request type. Only those PFMs that have been published to the B2B instance server and which support the selected B2B request type will be shown to the user for selection. Once a PFM has been selected, the user may enable or disable handling of the B2B request by using the checkbox provided in a checkbox column 1710.

The Advanced button can be used if the user wishes to qualify the selected PFM based on the buyer organization and/or supplier associated with the B2B request. In one embodiment, only associations between buyer organization and supplier that have been previously specified will be allowed. Specification of specific buyer organization or supplier to qualify a B2B request will result in a new row in the configuration window 1701, allowing a different PFM to be defined for a given buyer organization/supplier pair than that used for similar requests between other buyers and suppliers.

Once all changes have been made on this screen, a "Deploy" button is used to deploy these B2B request-to-PFM selections to the runtime environment for the current B2B instance.

While the foregoing is directed to the preferred embodiment of the present invention, other and further embodiments of the invention may be devised without departing from the basic scope thereof, and the scope thereof is determined by the claims that follow.

What is claimed is:

1. A system for handling a eCommerce request received from one of a plurality of requesting entities, comprising:
   a processor;
   a flow manager which, when executed by the processor, is configured to utilize runtime metadata to perform a process to map the request from an original format to a transformed format and to call one or more of at least two applications to process the received request, wherein the at least two applications are each configured to process requests in a corresponding transformed format; wherein a first application is configured to process a request of a first request type and a second application is configured to process a request of a second request type;
   wherein the runtime metadata comprises at least two access methods each configured to define an interface for the at least two applications, the at least two access methods comprising a first access method configured for the first request type and for the first application and a second access method configured for the second request type and for the second application; and
   wherein the process performed by the flow manager to map the request comprises:
      identifying which of the at least two applications the runtime metadata specifies for handling the request;
      invoking an instance of the access method configured for the identified application;
      retrieving, via the instance of the access method, a list of field elements described as inputs for the transformed format;
      for each field element in the list, determining and retrieving a corresponding value from the received request in the original format based on the runtime metadata;
      generating a data structure having the transformed format, the data structure comprising the retrieved values;
      invoking the identified application to process the request utilizing the generated data structure.

2. The system of claim 1, wherein the runtime metadata comprises mapping rules for mapping a plurality of fields of the request in the original format to input fields of at least one of the applications.

3. The system of claim 1, further comprising a front-end gateway in communication with the flow manager via a transport mechanism and, when executed by the processor, is configured to receive requests from the plurality of requesting entities.

4. The system of claim 3, wherein the front-end gateway, when executed by the processor, is configured to translate the request into a protocol understandable by the flow manager.

5. The system of claim 1, wherein the original format comprises cXML, mXML, xCBL, OCI, ebXML.

6. The system of claim 1, wherein the runtime metadata further comprises:
   message formatting rules comprising definitional data and configured to define an association between the definitional data and the data of the request in the original format;
   a process flow model configured to associate the message formatting rules and the access methods and comprising mapping rules configured to map a first plurality of input fields of the request in the original format to a second plurality of input fields of at least one of the applications.

7. The system of claim 6, wherein the association is between a first plurality of fields of the definitional data and a second plurality of fields of the data of the request in the original format.

8. The system of claim 1, wherein the at least two access methods comprise at least one of a program call access method, a Java program access method, and a queue application access method.

9. The system of claim 1, wherein invoking the identified application comprises:

invoking the identified application using an invocation method specified by the access method corresponding to the identified application, whereby the identified application processes the request utilizing the generated data structure.

10. The system of claim 1, wherein the runtime metadata specifies a sequence for invoking the at least two applications to process the received request.

* * * * *